United States Patent
Kwak et al.

(10) Patent No.: US 12,182,431 B2
(45) Date of Patent: *Dec. 31, 2024

(54) MEMORY SYSTEM AND METHOD OF OPERATING THE SAME

(71) Applicant: SK hynix Inc., Icheon-si (KR)

(72) Inventors: In Mo Kwak, Icheon-si (KR); Jeong Su Park, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,604

(22) Filed: Jun. 8, 2023

(65) Prior Publication Data

US 2023/0333763 A1    Oct. 19, 2023

Related U.S. Application Data

(63) Continuation of application No. 17/235,752, filed on Apr. 20, 2021, now Pat. No. 11,687,262.

(30) Foreign Application Priority Data

Nov. 4, 2020 (KR) .......................... 10-2020-0146306

(51) Int. Cl.
*G06F 3/06* (2006.01)

(52) U.S. Cl.
CPC ............ *G06F 3/064* (2013.01); *G06F 3/0604* (2013.01); *G06F 3/0635* (2013.01); *G06F 3/0659* (2013.01); *G06F 3/0679* (2013.01)

(58) Field of Classification Search
CPC ...... G06F 3/064; G06F 3/0604; G06F 3/0635; G06F 3/0659; G06F 3/0679; G06F 3/061;
(Continued)

(56) References Cited

U.S. PATENT DOCUMENTS 9,153,290 B1    10/2015  Bandic
10,417,190 B1    9/2019  Donlan
(Continued)

FOREIGN PATENT DOCUMENTS

| JP | 2013073409 A | 4/2013 |
| KR | 20160144577 A | 12/2016 |
| KR | 20200015233 A | 2/2020 |

*Primary Examiner* — Francisco A Grullon
(74) *Attorney, Agent, or Firm* — Perkins Coie LLP

(57) ABSTRACT

Memory systems and methods of operating the memory systems are disclosed. A memory system including a plurality of data storage zones may comprise a memory device including a plurality of zones for storing data, and a memory controller configured to control the memory device in performing a write operation in the memory device. The memory controller is configured to, upon performing a write operation corresponding to a write request received from a host, update a logical write pointer and a physical write pointer associated with a zone that is targeted to perform the write operation corresponding to the write request received from the host, and upon performing a write operation corresponding an internal write command internally issued by the memory controller, update a physical write pointer associated with the zone that is targeted to perform the write operation corresponding to an internal write command issued by the memory controller.

20 Claims, 25 Drawing Sheets

(58) Field of Classification Search
CPC .... G06F 3/0607; G06F 3/0644; G06F 3/0656; G06F 3/0658; G06F 3/0688; G06F 12/0246; G06F 3/0653; G06F 12/1009; G06F 2212/7201
See application file for complete search history.

(56) References Cited

U.S. PATENT DOCUMENTS

| | | | |
|---|---|---|---|
| 11,126,378 B1 | 9/2021 | Parker | |
| 11,687,262 B2* | 6/2023 | Kwak | G06F 3/0635 |
| | | | 711/154 |
| 2002/0083262 A1* | 6/2002 | Fukuzumi | G06F 3/0679 |
| | | | 711/217 |
| 2008/0109589 A1 | 5/2008 | Honda | |
| 2010/0241819 A1 | 9/2010 | Yoshii et al. | |
| 2015/0339319 A1* | 11/2015 | Malina | G06F 3/0605 |
| | | | 707/737 |
| 2017/0075807 A1 | 3/2017 | Tomlin | |
| 2021/0089217 A1* | 3/2021 | Bjørling | G06F 3/0652 |
| 2021/0132827 A1* | 5/2021 | Helmick | G06F 3/064 |
| 2021/0223994 A1* | 7/2021 | Kanno | G06F 3/0644 |
| 2021/0255803 A1 | 8/2021 | Kanno | |
| 2021/0334203 A1* | 10/2021 | Helmick | G06F 12/1054 |
| 2021/0374067 A1 | 12/2021 | Helmick | |
| 2022/0137817 A1 | 5/2022 | Kwak | |
| 2022/0156087 A1 | 5/2022 | Karr | |
| 2022/0188020 A1 | 6/2022 | Ishiguro | |
| 2022/0188223 A1 | 6/2022 | Schuh | |

\* cited by examiner

FIG. 18B

| Subzone ID | # of Invalid Pages |
|---|---|
| 1 | 0 |
| 2 | 0 |
| 3 | 11 |
| 4 | 5 |
| 5 | 6 |
| 6 | 0 |
| ⋮ | ⋮ |
| M | 0 |

MEMORY SYSTEM AND METHOD OF OPERATING THE SAME

CROSS-REFERENCE TO RELATED APPLICATION

This patent document is a continuation of U.S. patent application Ser. No. 17/235,752, filed Apr. 20, 2021, which claims the priority and benefits of the Korean patent application number 10-2020-0146306, filed on Nov. 4, 2020, which are incorporated herein by reference in their entireties.

TECHNICAL FIELD

Various embodiments of the disclosed technology generally relate to a memory system, and more particularly to a memory system using a zoned namespace and a method of operating the memory system.

BACKGROUND

The computer environment paradigm is transitioning to ubiquitous computing, enabling computing to appear anytime and anywhere. The recent increase in the use of ubiquitous computing is leading to an increase in the use of portable electronic devices such as mobile phones, digital cameras, and laptop computers. In general, such portable electronic devices use a memory system or a data storage device that includes a memory device such as a semiconductor memory device as its data storage medium. The data storage device is used as a main memory device or an auxiliary memory device of portable electronic devices.

Such a semiconductor-based data storage device provides advantages over the traditional hard disk drives since semiconductor memory devices have no mechanical moving part, and thus offers excellent stability and durability, high data rate, and low power consumption. Examples of the data storage devices include a universal serial bus (USB) memory device, memory cards, and a solid state drive (SSD).

SUMMARY

The embodiments of the disclosed technology relate to a memory system that exhibits an improved operational stability of a zoned namespace.

In some embodiments of the disclosed technology, a memory system including a plurality of data storage zones may comprise a memory device including a plurality of memory blocks corresponding to a plurality of zones for storing data, and a memory controller coupled to the memory device and configured to control the memory device in performing a write operation in the memory device. The memory controller is configured to, upon performing a write operation corresponding to a write request received from a host, update a logical write pointer and a physical write pointer associated with a zone that is targeted to perform the write operation corresponding to the write request received from the host, and upon performing a write operation corresponding an internal write command internally issued by the memory controller, update a physical write pointer associated with the zone that is targeted to perform the write operation corresponding to an internal write command issued by the memory controller.

An embodiment of the disclosed technology may provide for a memory system to which a zoned namespace is applied. The memory system may include a memory device and a memory controller. The memory device may include a plurality of memory blocks respectively corresponding to a plurality of zones. The memory controller may be configured to perform a write operation on the memory device. The memory controller may be configured to, when a write operation corresponding to a write request received from a host is performed, update a logical write pointer and a physical write pointer associated with a zone that is a target of the write operation, and when a write operation internally occurring in the memory controller is performed, update a physical write pointer associated with a zone that is a target of the write operation.

In an embodiment, the write operation internally occurring in the memory controller may be a dummy data write operation performed by a flash translation layer of the memory controller.

In an embodiment, the memory controller may be configured to, when a data write request is received from the host, compare a logical write pointer and a physical write pointer of a zone corresponding to the received write request with each other and process the write request based on a result of the comparison.

In an embodiment, when addresses indicated by the logical write pointer and the physical write pointer match each other, the memory controller may be configured to determine whether the logical write pointer has reached a size of the zone and process the write request based on a result of the determination.

In an embodiment, when the logical write pointer has reached the size of the zone, the memory controller may be configured to transfer a message indicating that the zone that is the target of the write operation is full to the host.

In an embodiment, when the logical write pointer does not reach the size of the zone, the memory controller may be configured to perform a data write operation corresponding to the write request.

In an embodiment, when addresses indicated by the logical write pointer and the physical write pointer do not match each other, the memory controller may be configured to determine whether the physical write pointer has reached a size of the zone and process the write request based on a result of the determination.

In an embodiment, when the physical write pointer has reached the size of the zone, the memory controller may be configured to transfer a message indicating that the zone that is the target of the write operation is full to the host.

In an embodiment, when the physical write pointer does not reach the size of the zone, the memory controller may be configured to perform a data write operation corresponding to the write request.

In an embodiment, the memory controller may be configured to, when a data read request and a read address corresponding thereto are received from a host, compare a logical write pointer and a physical write pointer of a zone corresponding to the received read request with each other and process the read request based on a result of the comparison.

In an embodiment, when addresses indicated by the logical write pointer and the physical write pointer match each other, the memory controller may be configured to perform a read operation based on the read address.

In an embodiment, when addresses indicated by the logical write pointer and the physical write pointer do not match each other, the memory controller may be configured to calculate a valid read address from the read address based on a valid page table, and perform a read operation based on the calculated valid read address.

In an embodiment, the valid page table may include information indicating whether data in each of pages stored in the zone that is a target of the read operation is user data received from the host or dummy data.

In an embodiment, the memory controller may be configured to calculate the valid read address from the read address depending on an offset based on the dummy data included in the valid page table.

In an embodiment, the memory controller may be configured to initialize a temporary address to the read address, count a first number of invalid pages between a start address of the zone that is the target of the read operation and the read address, update the temporary address based on the first number of invalid pages, count a second number of invalid pages between the temporary address before being updated and an updated temporary address, and determine whether the second number of invalid pages is 0.

In an embodiment, when the second number of invalid pages is 0, the memory controller may be configured to determine the updated temporary address to be the valid read address.

In an embodiment, when the second number of invalid pages is not 0, the memory controller may be configured to re-update the temporary address based on the second number of invalid pages.

In an embodiment, the memory controller may include a host interface layer and a flash translation layer. The host interface layer may be configured to receive a write request or a read request from the host. The flash translation layer may be configured to control the write operation internally occurring in the memory controller.

In an embodiment, the host interface layer may be configured to manage the logical write pointer, and the flash translation layer may be configured to manage the logical write pointer and the physical write pointer.

In an embodiment, the memory controller may further include a memory component. The memory component may include a write buffer configured to store write data received from the host, and a valid page table including information indicating whether data in each of pages stored in at least one of the plurality of zones is user data received from the host or dummy data.

BRIEF DESCRIPTION OF THE DRAWINGS

FIGS. 18A and 18B are diagrams for explaining a procedure for calculating a valid read address using a valid page table and an invalid page lookup table.

DETAILED DESCRIPTION

Specific structural features or functions for certain embodiments of the disclosed technology introduced in this patent document are examples only and implementations of the disclosed technology are not limited to those specific examples.

Figure 1A:
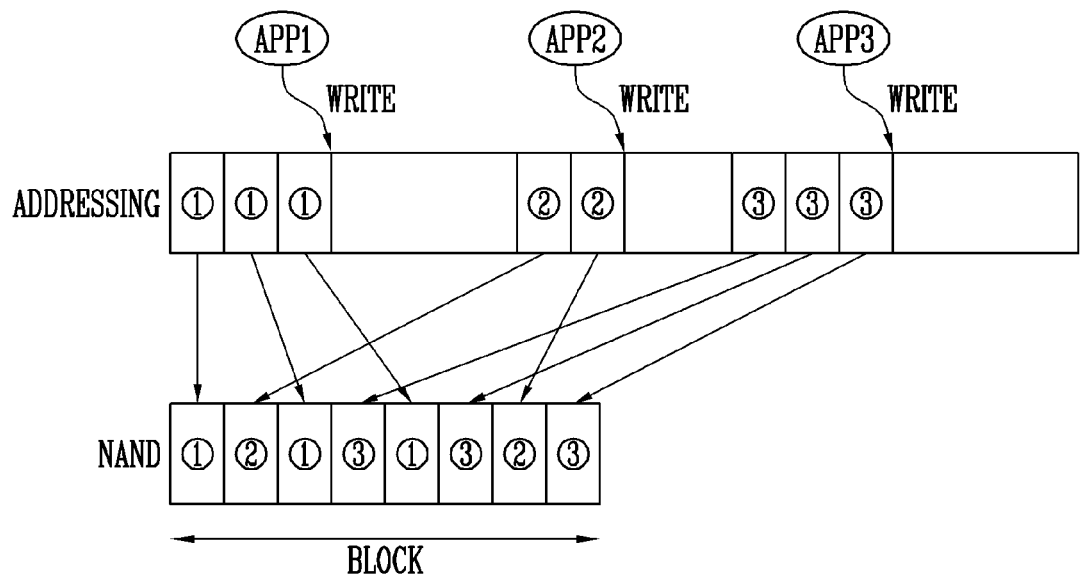
FIGS. 1A to 1C are diagrams illustrating a data storage method for a memory system.
Figure 1B:
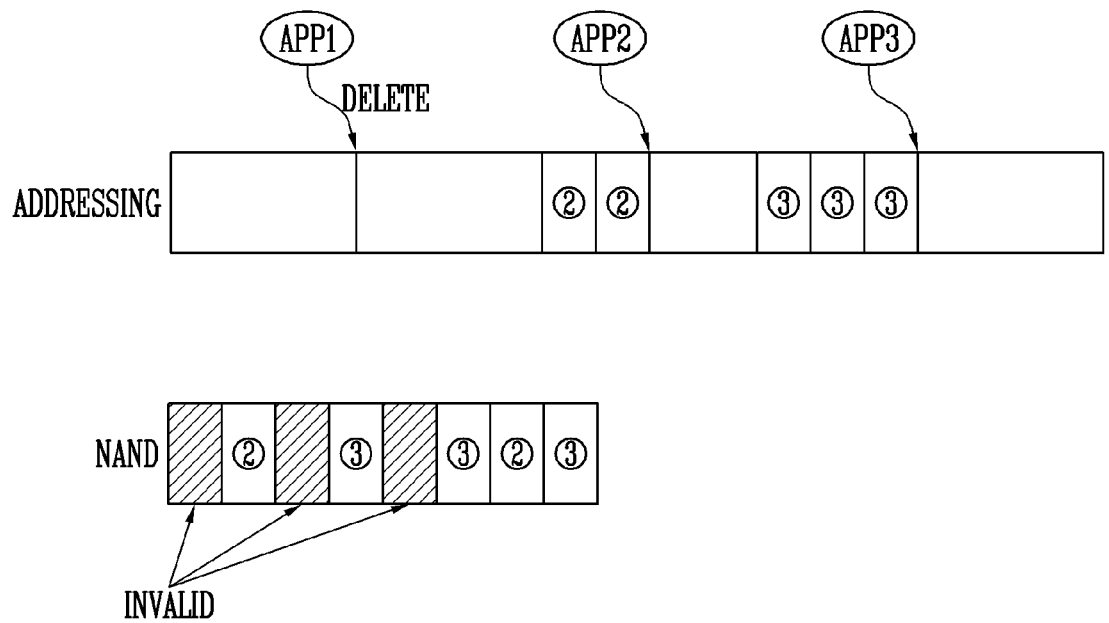
Figure 1C:
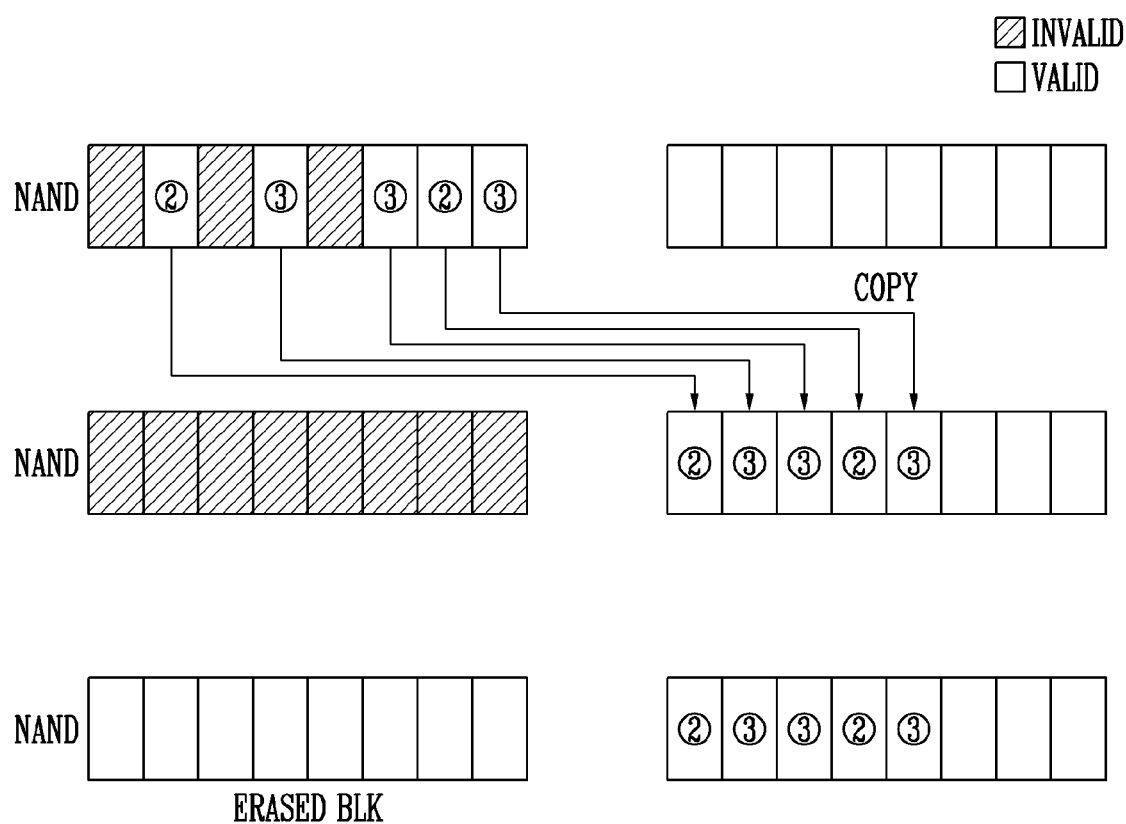

FIGS. 1A to 1C are diagrams illustrating a data storage method for a memory system.

Technologies such as artificial intelligence, big data, and a cloud are operated through a data center. The data center includes a memory system implemented as a flash memory, and a plurality of applications run for one memory system. The plurality of applications may run on a host such as a computer or a mobile phone. Each of the plurality of applications stores data at logical block addresses (LBA), and the memory system stores the data, stored at the logical block addresses, in one memory block. After pieces of data provided from different applications have been stored in one memory block, the memory system may map the logical block addresses to a physical address of the memory block.

FIG. 1A illustrates the case where three applications run for one memory system by way of example.

A plurality of logical block addresses are divided into areas corresponding to a plurality of applications, respectively, and the plurality of applications store data at logical block addresses included in areas corresponding thereto. As illustrated in FIG. 1A, a first application APP1 stores data at three logical block addresses, a second application APP2 stores data at two logical block addresses, and a third application APP3 stores data at three logical block addresses. The memory system programs pieces of data, stored in areas respectively corresponding to the first to third applications APP1 to APP3, to one memory block. Therefore, one memory block BLOCK includes all of pieces of data for the first to third applications APP1 to APP3, respectively.

FIG. 1B illustrates an erase operation performed in a memory system when a first application erases data.

The memory system performs a read operation and a program operation on a page basis whereas performing an erase operation on a memory block basis. When the first application APP1 issues an erase command for the programmed data in the state in which pieces of data for a plurality of applications are stored in one memory block BLOCK, the memory system may invalidate data corresponding to the first application APP1. As illustrated in FIG. 1B, among pieces of data included in the memory block BLOCK, data corresponding to the first application APP1 is invalid, and pieces of data corresponding to the second and third applications APP2 and APP3 are valid. When the size of invalid data included in the memory block is increased, the available capacity of the memory system is decreased, and thus the memory system may switch an area in which invalid data is stored to an available area by performing a garbage collection operation.

FIG. 1C is a diagram illustrating a garbage collection operation performed on a memory block BLK.

The memory system copies valid data stored in the memory block BLK to an empty memory block. Referring to FIG. 1C, the memory system copies the pieces of data for the second and third applications APP2 and APP3 which are pieces of valid data, other than the data for the first application APP1 which is invalid data, to the empty memory block. After the pieces of valid data have been copied to the empty memory block, the memory system invalidates all valid data, stored in the memory block, and then performs an erase operation on the memory block. The memory system performs a garbage collection operation by copying only the valid data present in the memory block including invalid data to the empty memory block and thereafter performing the erase operation on the memory block.

Due to the erase command issued by one application, the size of invalid data included in the memory block increases. When a garbage collection operation for removing invalid data is performed, a read operation and a program operation that are currently being performed are temporarily suspended, and thus the performance of the data storage device may be deteriorated. A data processing system that utilizes Zoned Namespaces (ZNS) may solve problems that would have resulted from conflicts between a plurality of applications and the deterioration of performance caused by the garbage collection operation.

Figure 2:
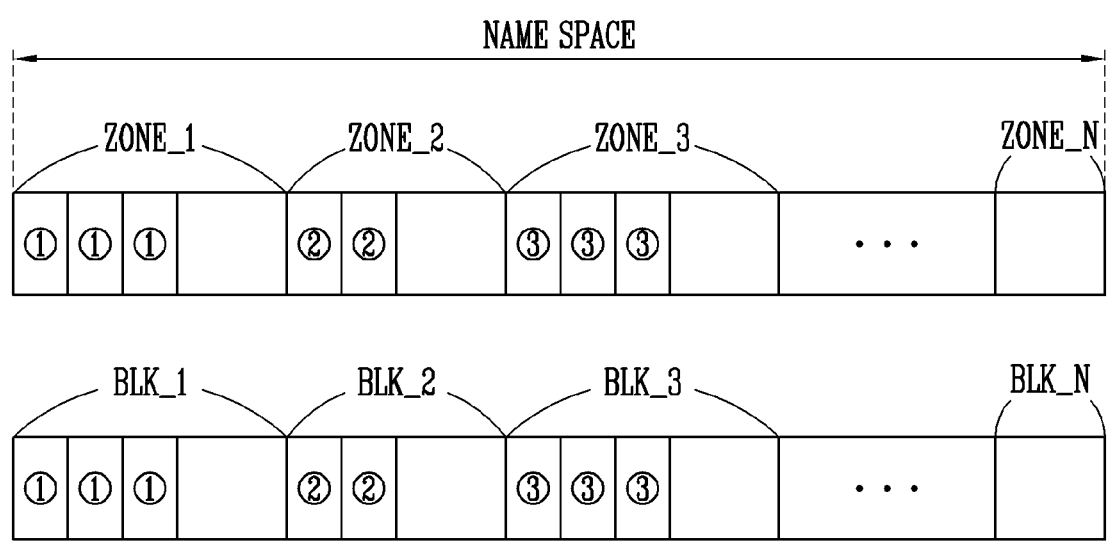
FIG. 2 is a diagram illustrating a data storage method for a data processing system that utilizes a zoned namespace.

FIG. 2 is a diagram illustrating a data storage method for a data processing system that utilizes a zoned namespace.

In some implementations, the data storage device may include a data storage space that is divided into a plurality of data storage zones. For example, the data storage device may include newer solid state drive (SSD) types such as Zoned Namespace (ZNS) drive, which enables the host of the SSD to allocate a smaller SSD segment (e.g., a zone or aggregation of multiple zones) for a specific requestor application so as to reach a finer grain differentiation with the others. A Zoned Namespace (ZNS) denotes a technology of utilizing a namespace by dividing the namespace into smaller segments or units such as zones. The namespace denotes the size of a nonvolatile memory that can be formatted to a logical block. In the data processing system that utilizes a zoned namespace, a plurality of applications can sequentially store pieces of data at logical block addresses of their own designated zones. Not only a plurality of logical block addresses but also physical areas of a memory system are divided into zones. Since one zone stores data for the same application, the attributes of the pieces of data stored in one zone are similar to each other. Also, the logical block addresses included 2 in one zone are consecutive, and memory blocks corresponding to respective zones are always sequentially programmed in the memory system to which a zoned namespace is applied.

Referring to FIG. 2, one namespace NAMESPACE may be composed of a plurality of zones ZONE_1 to ZONE_N. Respective sizes of the plurality of zones ZONE_1 to ZONE_N are equal to each other. One application may correspond to one zone, or may correspond to a plurality of zones in some cases. One zone includes a plurality of consecutive logical block addresses. An internal area of the memory device is also divided into units such as zones, and zones in a logical area respectively correspond to zones in a physical area. The sizes of respective zones in the physical area are equal to each other, and the size of each of the zones may be an integer multiple of an erase unit. For example, one zone may correspond to a memory block that is an erase unit, and first to N-th memory blocks BLK_1 to BLK_N illustrated in FIG. 2 may correspond to the first to N-th zones ZONE_1 to ZONE_N, respectively.

In the case where the first to third applications APP1 to APP3 correspond to the first to third zones ZONE_1 to ZONE_3, respectively, by way of example, the first application APP1 stores data at logical block addresses included in the first zone ZONE_1. The logical block addresses included in the first zone ZONE_1 are consecutive, and a host provides identification information for the corresponding zone and program data, together with a program command, to the memory system. The memory system sequentially programs the pieces of data, stored at the logical block addresses included in the first zone ZONE_1, to the first memory block BLK_1 corresponding to the first zone ZONE_1 based on the identification information for the zone.

Similarly, pieces of data for the second zone ZONE_2 and the third zone ZONE_3 may be stored in the second memory block BLK_2 and the third memory block BLK_3, respectively. In the case of a memory system that utilizes a zoned namespace, pieces of data provided from different applications are stored in different areas, among internal areas of the memory device, which are divided into zones. Therefore, an erase operation by one application does not influence data for other applications.

In the case of the memory system to which a zoned namespace is applied, pieces of data are sequentially stored in memory blocks corresponding to zones, after which the pieces of data are deleted on a zone basis, and thus a garbage collection operation is not needed. Therefore, the memory system to which the zoned namespace is applied has a very low write amplification factor (WAF) value. The WAF denotes how many additional programming operations, other than regular program operations, should be performed in the memory system (e.g., garbage collection), and is obtained by dividing the size (amount) of data actually programmed in the memory device by the size of data programmed in response to a host request. When a garbage collection operation is not performed, the value of WAF may be close to a value of "1."

The memory system can only perform a limited number of program operations. Since a program operation attributable to a garbage collection operation does not occur in the memory system that utilizes a zoned namespace, therefore, the lifespan of the memory system increases. Further, the size of an over-provision area decreases. The over-provision area is a spare area in the memory device that cannot be recognized by the host, and includes an area for a background operation of the memory system, such as garbage collection. In an example implementation, a memory system stores a table that includes mapping information between logical block addresses and physical addresses, in a volatile memory provided in a controller. In contrast, in the memory system that utilizes a zoned namespace, the memory device is used after being divided into zones of the same size, and program operations are sequentially performed in each of the zones, and thus a separate mapping table is not required. Therefore, the memory system that utilizes a zoned namespace may efficiently use the volatile memory.

The size of data provided by the host to the memory system at a time is different from that of a program unit of the memory system. In the case of a triple-level cell (TLC) memory device, the size of a program unit may be a value obtained by summing the sizes of a Least Significant Bit (LSB) page, a Central Significant Bit (CSB) page, and a Most Significant Bit (MSB) page, and may be greater than the size of data that is provided by the host to the memory system at a time. Therefore, the memory system temporarily stores program data in a write buffer provided in a controller disposed between the host and the memory device, and programs the data to a memory block when the size of the stored data satisfies the program unit. The memory system may allocate the area of the write buffer for each zone, and the size of the area allocated to one zone may be that of the program unit. An open zone denotes a zone to which the area of the write buffer is allocated, and the memory system performs a program operation only on the memory block corresponding to the open zone. In one example, the open zone may include erased memory cells that are available for writes by the hosts. In another example, the open zone may include partially programmed memory cells that are available for further writes by the hosts.

Since the write buffer is implemented as a volatile memory, there is a concern that, when the power of the memory system fails, data stored in the write buffer will be lost. Therefore, the memory system is provided with an emergency power supply, and backs up the data, stored in the write buffer, to a nonvolatile memory using power supplied from the emergency power supply when a power failure occurs. Since the emergency power supply is capable of supplying power for a limited period of time, the size of data that can be backed up by the memory system from the write buffer to the nonvolatile memory within the limited time is also limited. Therefore, the size of the write buffer is defined as the size of data that can be backed up during the time during which power is supplied from the emergency power supply. Since the size of the write buffer is limited, the number of zones to which the areas of the write buffer are allocated is also limited. Therefore, the number of open zones that can be simultaneously present or available is limited, and the number of applications that can simultaneously run is limited when the number of open zones that can be simultaneously present or available is limited. If a data center in communication with a server can only perform a small number of applications simultaneously, its performance would be affected.

Figure 3:
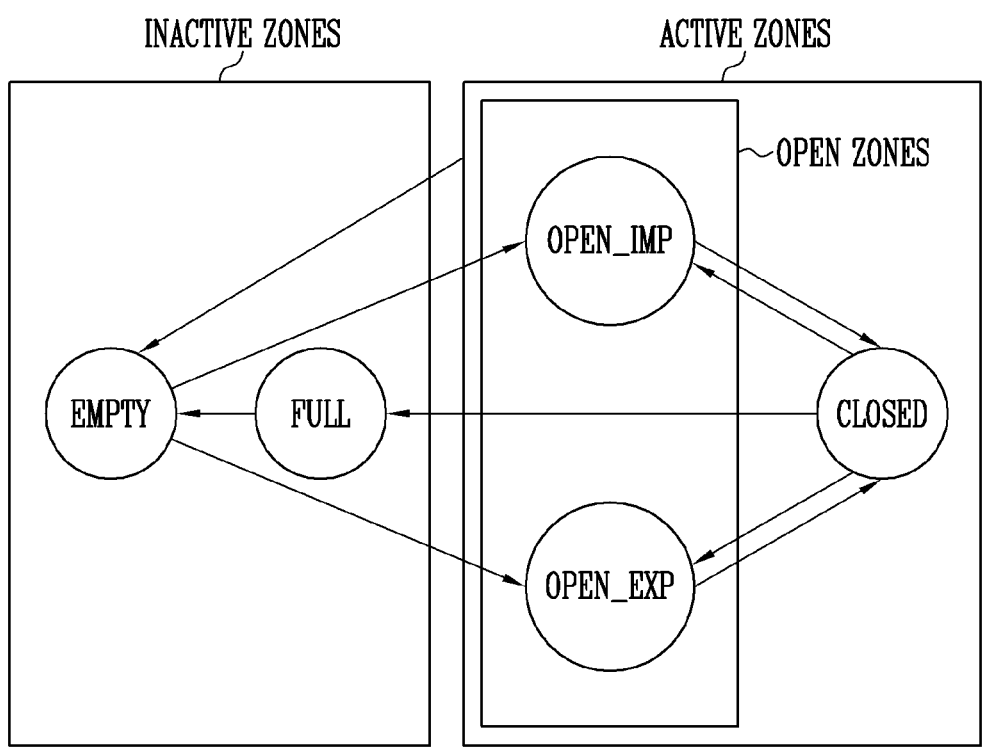
FIG. 3 is a diagram showing possible states of the zones.

FIG. 3 is a diagram showing possible states of the zones.

The zones may be classified into active zones (ACTIVE ZONES) and inactive zones (INACTIVE ZONES) depending on possible states which respective zones can have. The active zones include open zones (OPEN ZONES) and a closed zone (CLOSED), and the inactive zones include an empty zone (EMPTY) and a full zone (FULL). The number of open zones is limited by the capacity of a write buffer, as described above. In addition, the number of closed zones is limited, and thus the number of active zones is also limited.

The above-described open zones may be classified into an explicitly opened zone and an implicitly opened zone. When the host explicitly provides a command for instructing a certain zone to switch to an open zone to the memory system, the open zone switched in response to the command may be an explicitly opened zone OPENED_EXP. When the host provides only a program command and identification information corresponding to the zone to the memory system without explicitly providing a command for instructing to switch to an open zone, the memory system autonomously switches the zone to an open zone and performs a program operation. The open zone autonomously switched by the memory system is an implicitly opened zone OPENED_IMP. When a program command for a zone other than open zones is issued in the state in which all areas of the write buffer are allocated to open zones, the memory system switches any one of the open zones to a closed zone (CLOSED). The closed zone may be switched from the open zone. When a program command is issued for the closed zone, which is switched for the above-described reason, the corresponding closed zone (CLOSED) may switch back to the open zone.

When pieces of data in all pages in a memory block corresponding to an open zone are completely programmed, the memory system switches the open zone to a closed zone, and then switches the closed zone to a full zone. Such a full zone (FULL) denotes a zone in which no empty area is present in the corresponding memory block. When an application provides an erase command for the full zone or the active zones to the memory system, the memory system performs an erase operation on the memory block corresponding to the zone for the erase command, and thereafter switches the zone to an empty zone. The empty zone (EMPTY) denotes a zone in which the corresponding memory block is an empty memory block.

As described above, the number of zones included in the active zones is limited. In a situation in which all areas in the write buffer are allocated to open zones and the number of closed zones cannot be increased any further, if a new application runs and then an open zone should be generated, the memory system cannot allocate a new open zone any further. Therefore, when the number of zones included in the active zones reaches a threshold value, a problem arises in that the number of applications that may simultaneously run cannot be increased any further.

Figure 4:
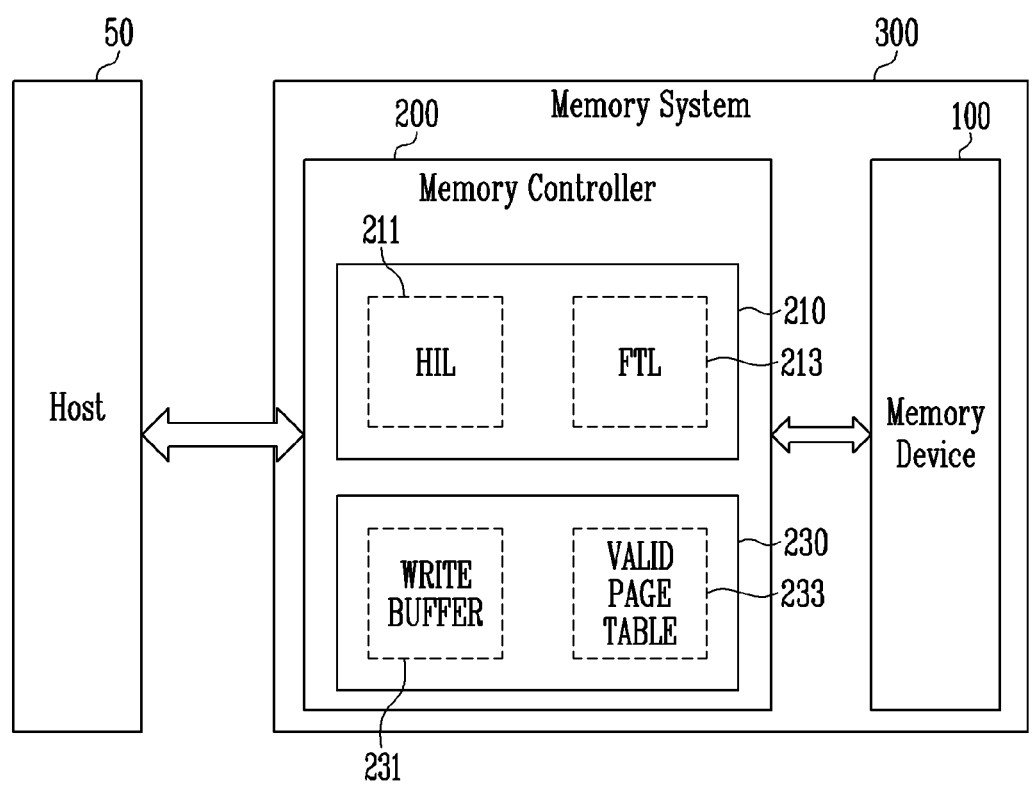
FIG. 4 is a block diagram illustrating a memory system based on an embodiment of the disclosed technology.

FIG. 4 is a block diagram illustrating a memory system based on an embodiment of the disclosed technology. Referring to FIG. 4, a memory system 300 includes a memory device 100 and a memory controller 200. The memory system 300 may communicate with a host 50. The memory device 100 may be a nonvolatile memory device. In an example, the memory device 100 may be a NAND flash memory device. The memory device 100 may be operated under the control of the memory controller 200. In some implementations, the memory device 100 may be operated in response to a command received from the memory controller 200.

The memory controller 200 may include a data processor 210 and a memory component 230. The data processor 210 may include a host interface layer (HIL) 211 and a flash translation layer (FTL) 213. The memory component 230 may include a write buffer 231 and a valid page table 233.

The HIL 211 of the data processor 210 may perform operations related to communication between the memory controller 200 and the host 50. In some implementations, the HIL 211 may receive a write request or a read request from the host 50. When a write request is received from the host 50, the HIL 211 may receive write data from the host 50. The received write data may be stored in the write buffer 231 of the memory component 230. The HIL 211 may transfer read data to the host 50 in response to a read request.

The FTL 213 of the data processor 210 may control the operation of the memory device 100 in response to requests received from the host 50. For example, when the HIL 211 receives a write request and write data from the host 50, the FTL 213 may generate a program command and program data corresponding to the write request and the write data, and may transfer the program command and the program data to the memory device 100. When the HIL 211 receives a read request from the host 50, the FTL 213 may generate a read command corresponding to the read request, and may transfer the read command to the memory device 100. The FTL 213 may receive read data from the memory device 100, and may store the read data in a read buffer. Although not illustrated in FIG. 4, the read buffer may be included in the memory component 230.

In an embodiment, the HIL 211 and the FTL 213 may be configured as a single processor. Here, the data processor 210 may be implemented as a single processor. In an embodiment, the HIL 211 and the FTL 213 may be configured as separate processors.

The write buffer 231 may temporarily store the write data received from the host 50. The write data, temporarily stored in the write buffer 231, may be converted into program data, and may then be transferred to the memory device 100. During this process, the program data may be generated through a data randomizing operation, an ECC-encoding operation, etc. performed on the write data.

The valid page table 233 may include information indicating whether data areas respectively included in a plurality of zones corresponding to the storage area of the memory device 100 are valid. A detailed configuration of the valid page table 233 will be described later with reference to FIG. 13.

Figure 5A:
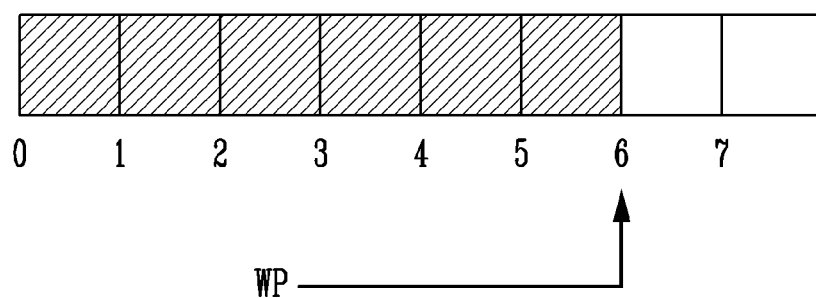
FIGS. 5A and 5B are diagrams illustrating a write pointer when dummy data is written to a zoned namespace (ZNS).
Figure 5B:
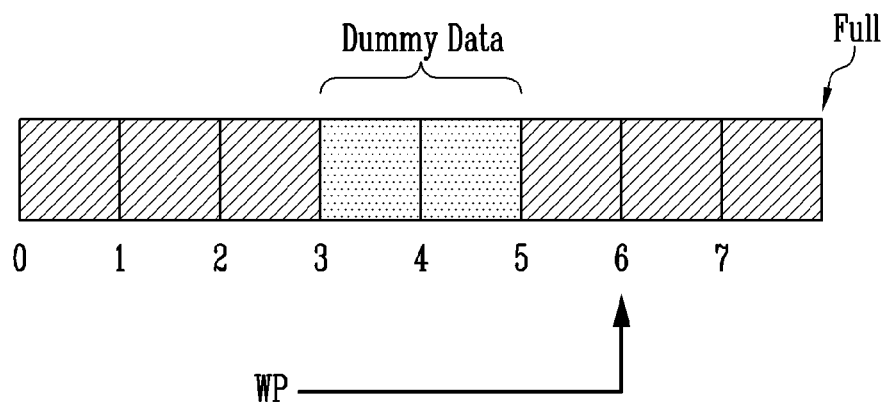

FIGS. 5A and 5B are diagrams illustrating a write pointer when dummy data is written to a zoned namespace (ZNS). In this patent document, the term "dummy data" is used to indicate benign information that does not contain any useful data but is inserted to fill empty spaces in the zone.

Referring to FIG. 5A, a plurality of pages included in one zone of a memory device are exemplarily illustrated. For convenience of description, one zone is illustrated as including eight pages in FIGS. 5A and 5B.

In FIG. 5A, pages to which data received from a host is written are illustrated as hatched areas, and pages to which data is not written are illustrated as empty areas. Whenever a write operation is performed in the zone, an area indicated by a write pointer WP is moved by one page. When executing the command, the memory controller may write the data within the zone indicated, but in some implementations, the data may be written based on a write pointer position. In one example, each zone may have a write pointer maintained by the memory controller or the data storage device that keeps track of the start position of the next write operation. FIG. 5A shows that pieces of data are written to pages ranging from page #0 to page #5 in the zone, and are not written to page #6 and page #7.

Referring to FIG. 5B, the case where dummy data is written during the writing of data is illustrated. In the case of a memory system that utilizes a zoned namespace, a situation in which dummy data is written to some of a plurality of pages included in a zone may happen. For example, when a sudden power-off (SPO) occurs in the memory system, the memory system may flush write data, stored in the write buffer 231, into the memory device 100, and may control the memory device 100 to program the flushed data. In some cases, in order to satisfy the program unit of data, dummy data is generated in addition to the data temporarily stored in the write buffer 231, the dummy data may be generated and transferred to the memory device 100. In this case, the memory device 100 may also program the dummy data in addition to the data stored in the write buffer 231.

That is, the dummy data may be data irrelevant to the write data transferred from the host 50 to the memory system 300, and may be data autonomously generated by the memory system 300.

FIG. 5B, areas to which dummy data is written are illustrated as dotted areas. That is, dummy data is written to page #3 and page #4 in the zone. During the writing of the dummy data, a write pointer is not moved. The reason for this is that the dummy data is not user data received from the host 50. Accordingly, even if the write pointer still indicates page #6, data is actually written to all of pages (ranging from page #0 to page #7) in the zone. That is, although the zone is full, the write pointer WP indicates pages #6 and #7 as if the pages #6 and #7 were empty pages.

In accordance with a memory system and a method of operating the memory system based on the disclosed technology, a write pointer WP in a zone may include a logical write pointer LWP and a physical write pointer PWP, which are maintained in a flash translation layer (FTL). The logical write pointer LWP may denote a write pointer that can be identified by a host and an HIL. The physical write pointer PWP may indicate the actual position of the last data written to the memory device. Here, the last data may include dummy data, which is benign information that does not contain any useful data but is inserted to fill empty spaces in the zone. That is, the physical write pointer PWP includes the concept of dummy writing that progresses due to an internal operation performed by the FTL.

Figure 6:
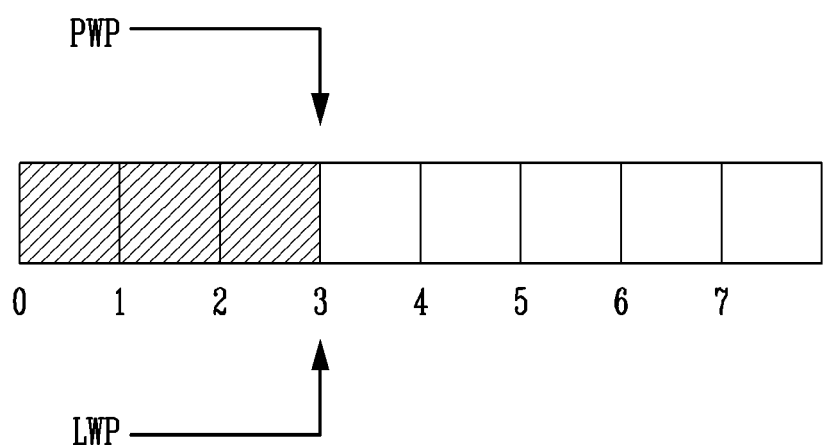
FIG. 6 is a diagram illustrating a ZNS operation method that uses a logical write pointer and a physical write pointer based on an embodiment of the disclosed technology.

FIG. 6 is a diagram illustrating a ZNS operation method that uses a logical write pointer and a physical write pointer based on an embodiment of the disclosed technology. Referring to FIG. 6, a write pointer WP in a zone is managed such that it is separated into a logical write pointer LWP and a physical write pointer PWP in a flash translation layer (FTL). The logical write pointer LWP may denote a write pointer identified from the standpoint of a host and an HIL. Accordingly, the logical write pointer LWP is updated when data received from the host is written. The physical write pointer PWP may be a value indicating the position of last data that is actually written to the memory device and includes dummy data. Accordingly, the physical write pointer PWP is updated when data received from the host is written, and is also updated even when dummy data is written by the FTL. Referring to FIG. 6, data received from the host is written to page #0 to page #2. Dummy data is not written, and thus positions indicated by the logical write pointer LWP and the physical write pointer PWP are identical to each other.

Figure 7:
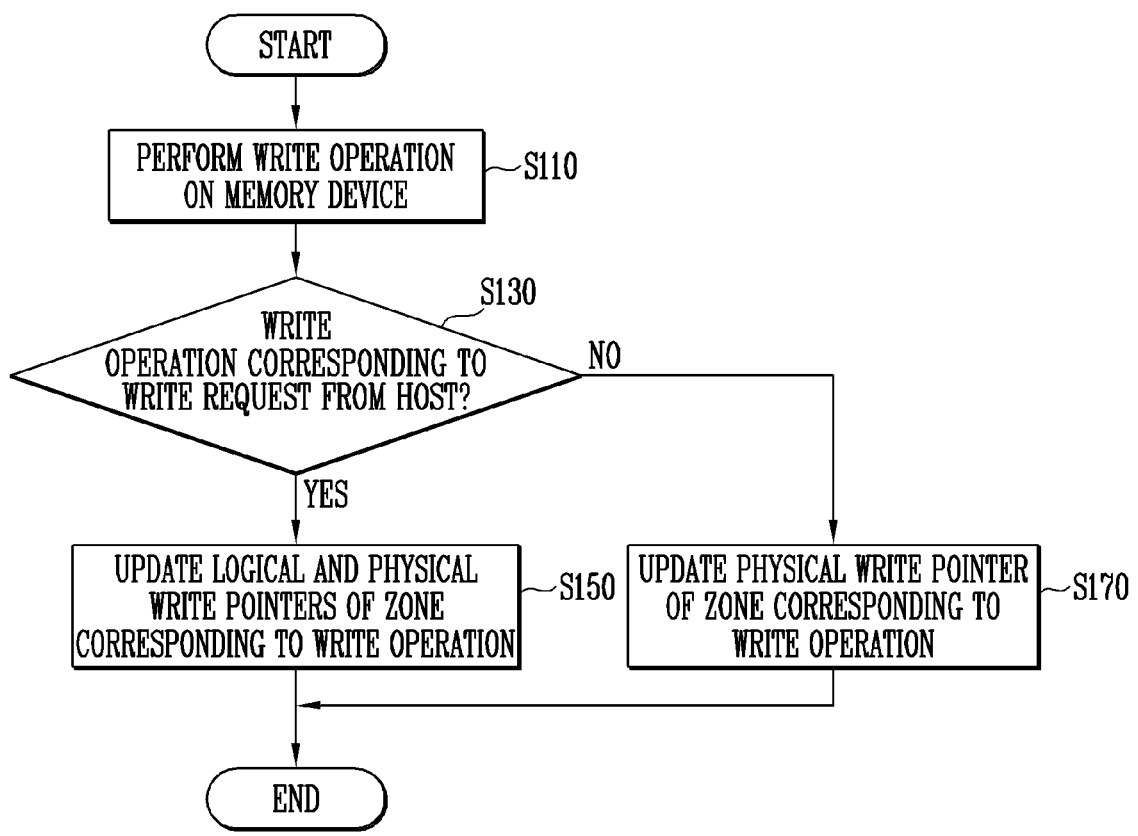
FIG. 7 is a flowchart illustrating a method of updating a logical write pointer and a physical write pointer based on an embodiment of the disclosed technology.

FIG. 7 is a flowchart illustrating a method of updating a logical write pointer and a physical write pointer based on an embodiment of the disclosed technology. FIGS. 8A, 8B, 9A, and 9B show methods for updating the logical write pointer and the physical write pointer based on the method illustrated in FIG. 7.

Referring to FIG. 7, a memory controller 200 performs a write operation on a memory device 100 at step S110. At step S110, the FTL 213 of the memory controller 200 may generate a program command for the memory device 100. The memory device 100 may perform a program (write) operation in response to the program command received from the memory controller 200.

At step S130, whether the write operation performed on the memory device 100 corresponds to a write request received from the host 50 is determined. When it is determined that the write operation performed on the memory device corresponds to the write request received from the host (in the case of Yes at step S130), it means that the data stored in the memory device 100 is write data received from the host. Therefore, the FTL of the memory controller 200 updates both the logical write pointer and the physical write pointer of a zone corresponding to the write operation, performed at step S110, at step S150.

When it is determined that the write operation performed on the memory device does not correspond to the write request received from the host (in the case of No at step S130), it means that the data stored in the memory device 100 is dummy data rather than write data received from the host. Therefore, the FTL of the memory controller 200 updates the physical write pointer of the zone corresponding to the write operation, performed at step S110, at step S170. At step S170, the logical write pointer will not be updated.

Figure 8A:
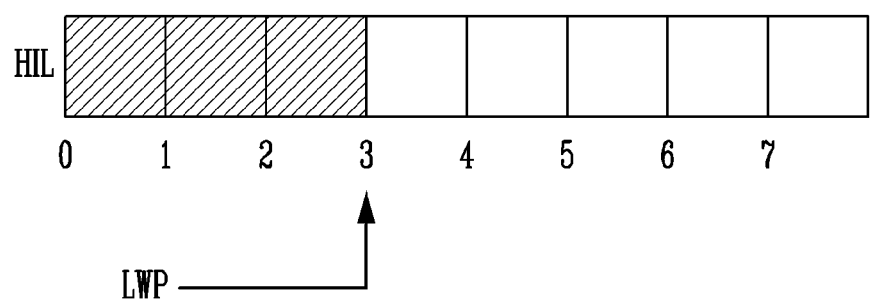
FIGS. 8A-8B show methods for updating a logical write pointer and a physical write pointer based on the method illustrated in FIG. 7.
Figure 8B:
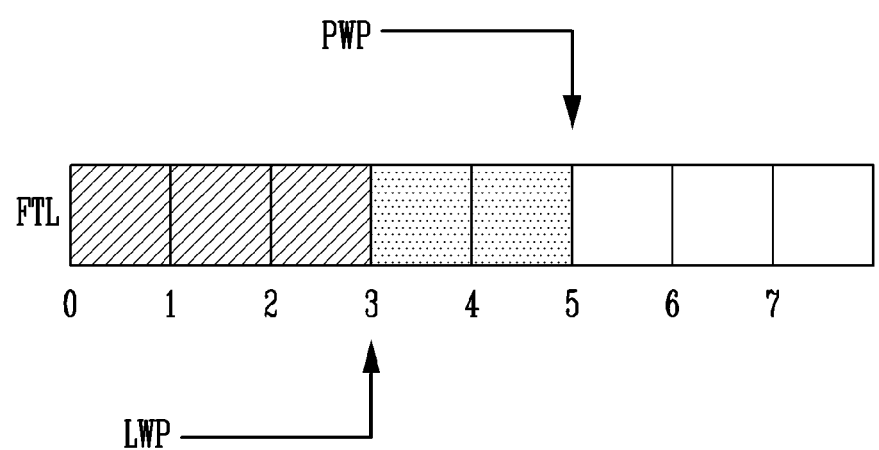

Referring to FIGS. 8A and 8B, a write pointer update method performed when dummy data is written in the state of the zone illustrated in FIG. 6 is illustrated. In FIG. 6, data is written up to page #2 and dummy data is not written. Therefore, positions indicated by the physical write pointer and the logical write pointer are identical to each other. In this state, dummy data may be written to two pages. As illustrated in FIG. 8A, although an operation of writing dummy data is performed by the FTL 213, the position indicated by the logical write pointer LWP is not updated from the standpoint of the HIL 211. As illustrated in FIG. 8B, when the operation of writing dummy data is performed by the FTL 213, the FTL 213 updates the position indicated by the physical write pointer PWP as the corresponding write operation is performed. Accordingly, the positions indicated by the physical write pointer PWP and the logical write pointer LWP may be different from each other.

Referring to FIG. 8B, data written to page #3 and page #4 is dummy data, and thus step S170 is performed based on the determination at step S130. That is, when dummy data is written, the position indicated by the logical write pointer LWP is not updated, and the position indicated by the physical write pointer PWP is updated.

Figure 9A:
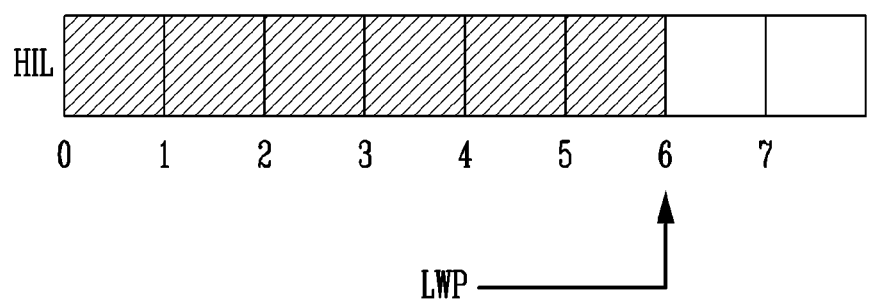
FIGS. 9A-9B show methods for updating a logical write pointer and a physical write pointer based on the method illustrated in FIG. 7.
Figure 9B:
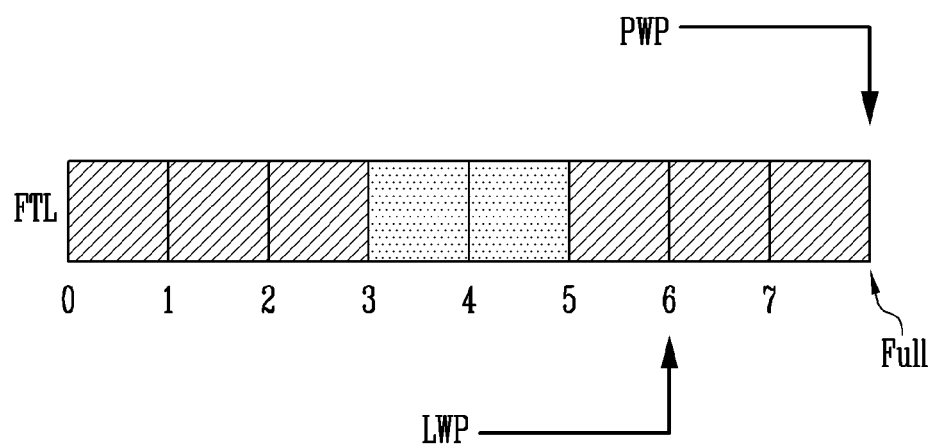

Referring to FIGS. 9A and 9B, a write pointer update method performed when data received from the host is written in the state of the zone illustrated in FIGS. 8A and 8B is illustrated. In the state of the zone illustrated in FIGS. 8A and 8B, data is written up to page #4 of the corresponding zone. Since dummy data is written to the corresponding zone, the positions indicated by the physical write pointer and the logical write pointer are different from each other. In this state, data may be written to three pages in response to a request received from the host. As illustrated in FIG. 9A, the position indicated by the logical write pointer LWP is updated by three pages from the standpoint of the HIL 211. As illustrated in FIG. 9B, when the write operation based on the request received from the host is performed, the FTL 213 may update the positions indicated by the logical write pointer LWP and the physical write pointer PWP by three pages as the corresponding write operation is performed.

Referring to FIG. 9B, data written to pages from page #5 to page #7 is data received from the host, and thus step S150 is performed based on the determination at step S130. That is, when user data received from the host is written, the positions indicated by the logical write pointer LWP and the physical write pointer PWP are updated by the same number of pages.

Referring to FIG. 9B, the physical write pointer PWP has already reached the size of the zone (i.e., eight pages), which means that the corresponding zone is full. In contrast, referring to FIG. 9A, from the standpoint of the HIL 211, the logical write pointer LWP indicates page #6, and thus it may be determined that an amount of data corresponding to two pages can be further written. In order to avoid such discrepancy, when a write request and write data are received from the host, the memory controller based on the embodiment of the disclosed technology determines whether addresses indicated by a logical write pointer and a physical write pointer corresponding to the received write request match each other.

When it is determined that the addresses indicated by the logical write pointer and the physical write pointer match each other, it means that dummy data is not written to the corresponding zone. Therefore, the HIL 211 may determine, based on the position indicated by the logical write pointer, whether an available space for writing data received from the host remains in the corresponding zone. When the available space for writing the data received from the host remains in the corresponding zone, the HIL 211 may temporarily store the received data in the write buffer 231, and may transfer a normal response message corresponding to the write request to the host 50. When the available space for writing the data received from the host does not remain in the corresponding zone, the HIL 211 may transfer a write failure message to the host 50. In this case, the state of the zone may be changed to a full zone (FULL) illustrated in FIG. 3, and another zone for writing the corresponding data may be selected.

When it is determined that the logical write pointer and the physical write pointer do not match each other, it means that dummy data is written to the corresponding zone. Therefore, the FTL 213 may determine, based on the position indicated by the physical write pointer, whether an available space for writing data received from the host remains in the corresponding zone. When the available space for writing the data received from the host remains in the corresponding zone, the FTL 213 may notify the HIL 211 that the available space is present in the corresponding zone. In this case, the HIL 211 may temporarily store the received data in the write buffer 231, and may transfer a normal response message corresponding to the write request to the host 50. When the available space for writing the data received from the host does not remain in the corresponding zone, the FTL 213 may notify the HIL 211 that an available space is not present in the corresponding zone. In this case, the HIL 211 may transfer a write fail message to the host 50. In this case, the state of the zone may be changed to a full zone (FULL) illustrated in FIG. 3, and another zone for writing the corresponding data may be selected.

Figure 10:
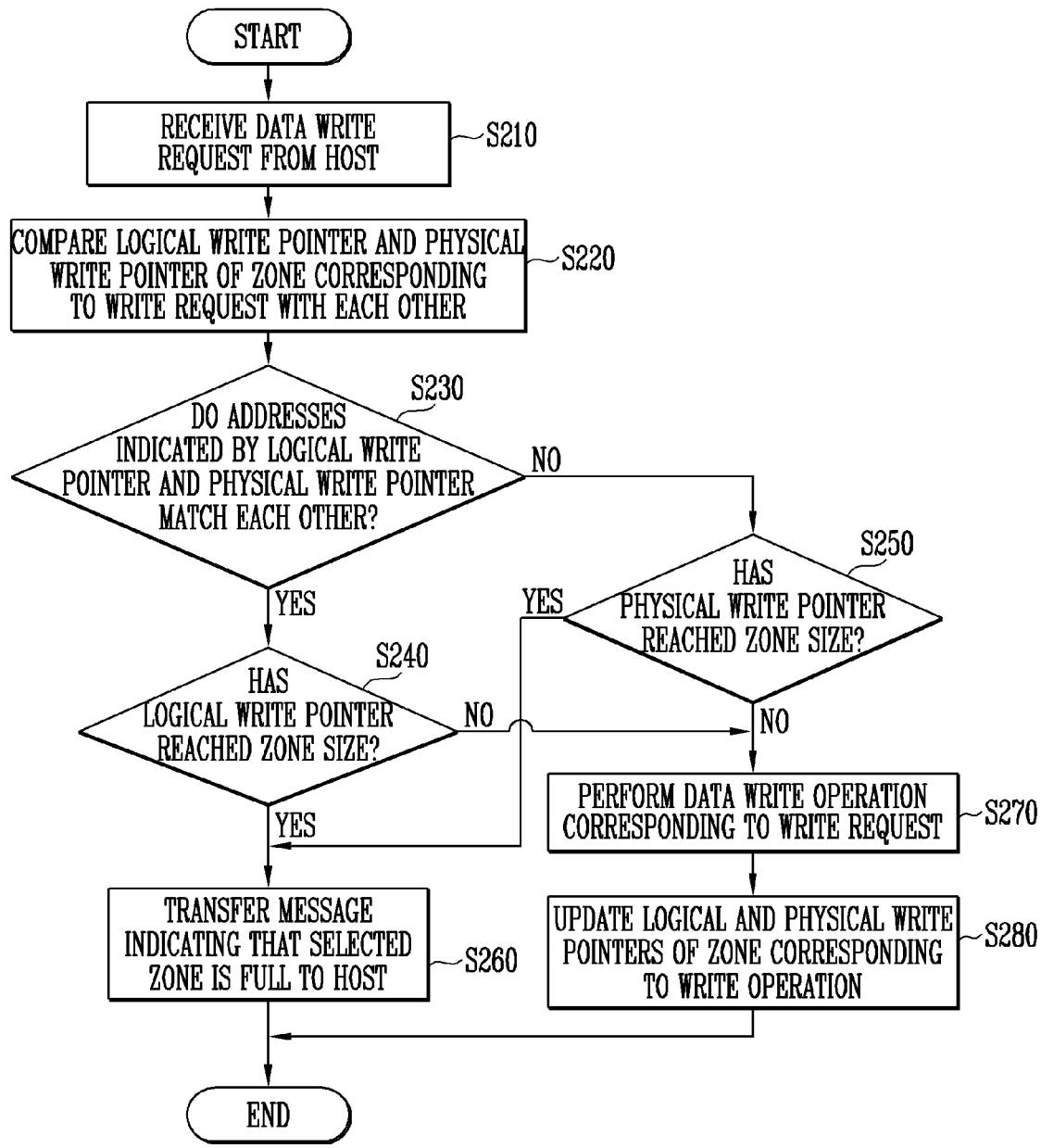
FIG. 10 is a flowchart illustrating the operation of a memory controller based on an embodiment of the disclosed technology.

FIG. 10 is a flowchart illustrating the operation of a memory controller based on an embodiment of the disclosed technology. More specifically, FIG. 10 is a flowchart illustrating the operation of the memory controller when a write request is received from the host.

Referring to FIG. 10, the memory controller 200 receives a data write request from the host at step S210. The memory controller 200 compares a logical write pointer LWP and a physical write pointer PWP of a zone corresponding to the write request with each other at step S220. Step S220 may be performed by the FTL 213 of the memory controller 200.

Whether the positions indicated by the logical write pointer LWP and the physical write pointer PWP are identical to each other is determined at step S230. When the positions indicated by the logical write pointer LWP and the physical write pointer PWP are identical to each other (in the case of Yes at step S230), it means that dummy data is not stored in the corresponding zone. Therefore, whether the logical write pointer LWP has reached the size of the zone is determined at step S240. When the logical write pointer LWP has reached the size of the zone (in the case of Yes at step S240), a message indicating that the corresponding zone (i.e., selected zone) is full is transferred to the host 50 at step S260. When the logical write pointer LWP has not reached the size of the zone (in the case of No at step S240), a data write operation corresponding to the write request received from the host is performed at step S270. At step S270, a program command and program data corresponding to the received write request and received data, respectively, may be transferred to the memory device 100. The memory device 100 may perform a program operation based on the received program command and the received program data. The logical and physical write pointers of the zone corresponding to the write operation are updated at step S280. Step S280 may correspond to step S150 of FIG. 7.

When the positions indicated by the logical write pointer LWP and the physical write pointer PWP are not identical to each other (in the case of No at step S230), it means that dummy data is stored in the corresponding zone. Therefore, whether the physical write pointer PWP has reached the size of the zone is determined at step S250. When it is determined that the physical write pointer PWP has reached the size of the zone (in the case of Yes at step S250), a message indicating that the corresponding zone (selected zone) is full is transferred to the host 50 at step S260. When the physical write pointer PWP has not reached the size of the zone (in the case of No at step S250), a data write operation corresponding to the write request received from the host is performed at step S270. At step S270, a program command and program data corresponding to the received write request and received data, respectively, may be transferred to the memory device 100. The memory device 100 may perform a program operation based on the received program command and the received program data. The logical and physical write pointers of the zone corresponding to the write operation are updated at step S280. Step S280 may correspond to step S150 of FIG. 7.

Figure 11:
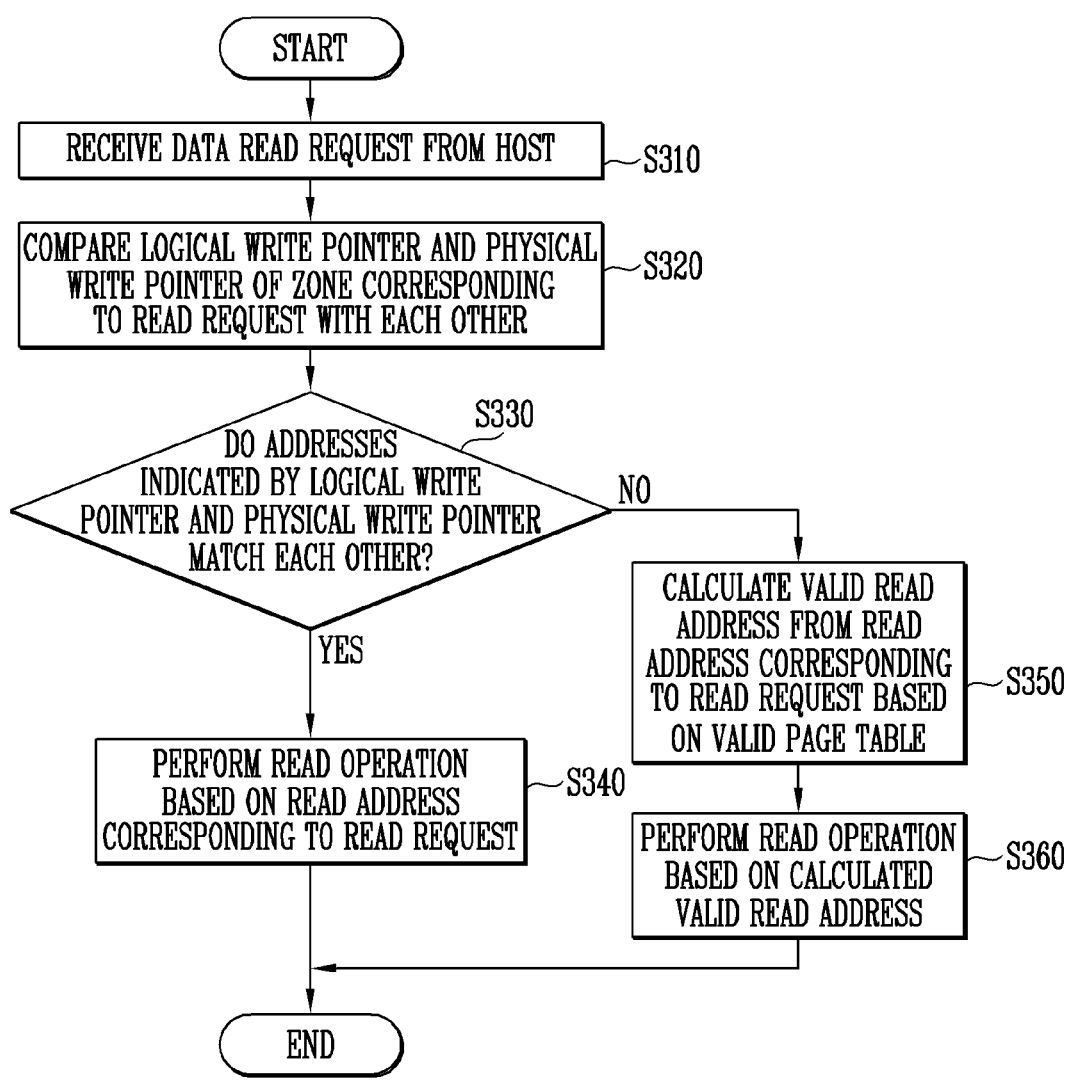
FIG. 11 is a flowchart illustrating the operation of a memory controller based on an embodiment of the disclosed technology.

FIG. 11 is a flowchart illustrating the operation of a memory controller based on an embodiment of the disclosed technology. More specifically, FIG. 11 is a flowchart illustrating the operation of the memory controller when a read request is received from the host.

Referring to FIG. 11, the memory controller 200 may receive a data read request from the host at step S310. The FTL 213 of the memory controller 200 compares a logical write pointer LWP and a physical write pointer PWP of a zone corresponding to the read request with each other at step S320. Whether addresses indicated by the logical write pointer LWP and the physical write pointer PWP match each other is determined at step S330.

When the addresses indicated by the logical write pointer LWP and the physical write pointer PWP match each other (in the case of Yes at step S330), it means that dummy data is not stored in the corresponding zone. Therefore, a read operation is performed based on a read address corresponding to the read request at step S340. Since dummy data is not stored in the zone that is a read target, a read operation may be performed by directly using the read address received from the host 50. In this patent document, the term "read target" is used to indicate a zone that is targeted to perform a read operation.

When the addresses indicated by the logical write pointer LWP and the physical write pointer PWP do not match each other (in the case of No at step S330), it means that dummy data is stored in the corresponding zone. Therefore, the read address corresponding to the read request cannot be used without change, and the read operation should be performed by applying an offset corresponding to the dummy data to the read address. Therefore, a valid read address is calculated from the read address corresponding to the read request based on a valid page table at step S350, and the read operation is performed based on the calculated valid read address at step S360. The valid page table may be a table indicating whether each of pieces of page data stored in the zone corresponds to write data received from the host, that is, valid data, or corresponds to dummy data, that is, invalid data. A valid read address corresponding to the read address received from the host may be calculated by suitably applying the offset depending on the dummy data to the read address. That is, the valid read address may be an address obtained by applying the offset depending on dummy data to the read address. Examples of step S350 will be described in detail below with reference to FIGS. 12 and 13.

Figure 12:
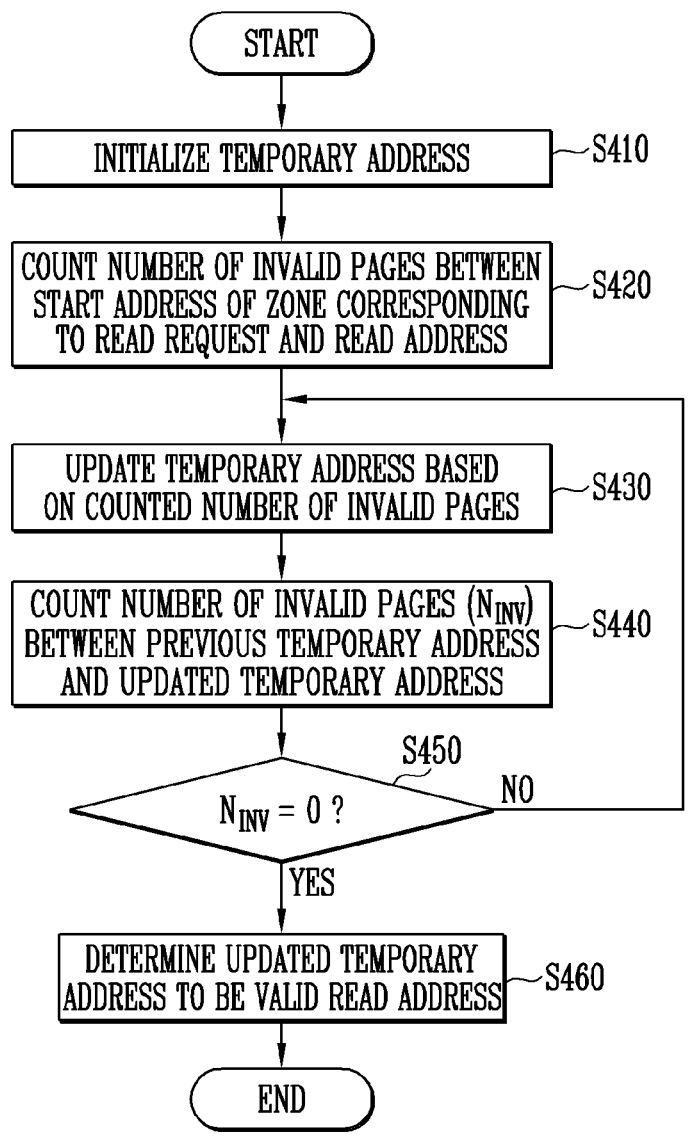
FIG. 12 is a flowchart illustrating an example of the step of calculating a valid read address illustrated in FIG. 11.
Figure 13:
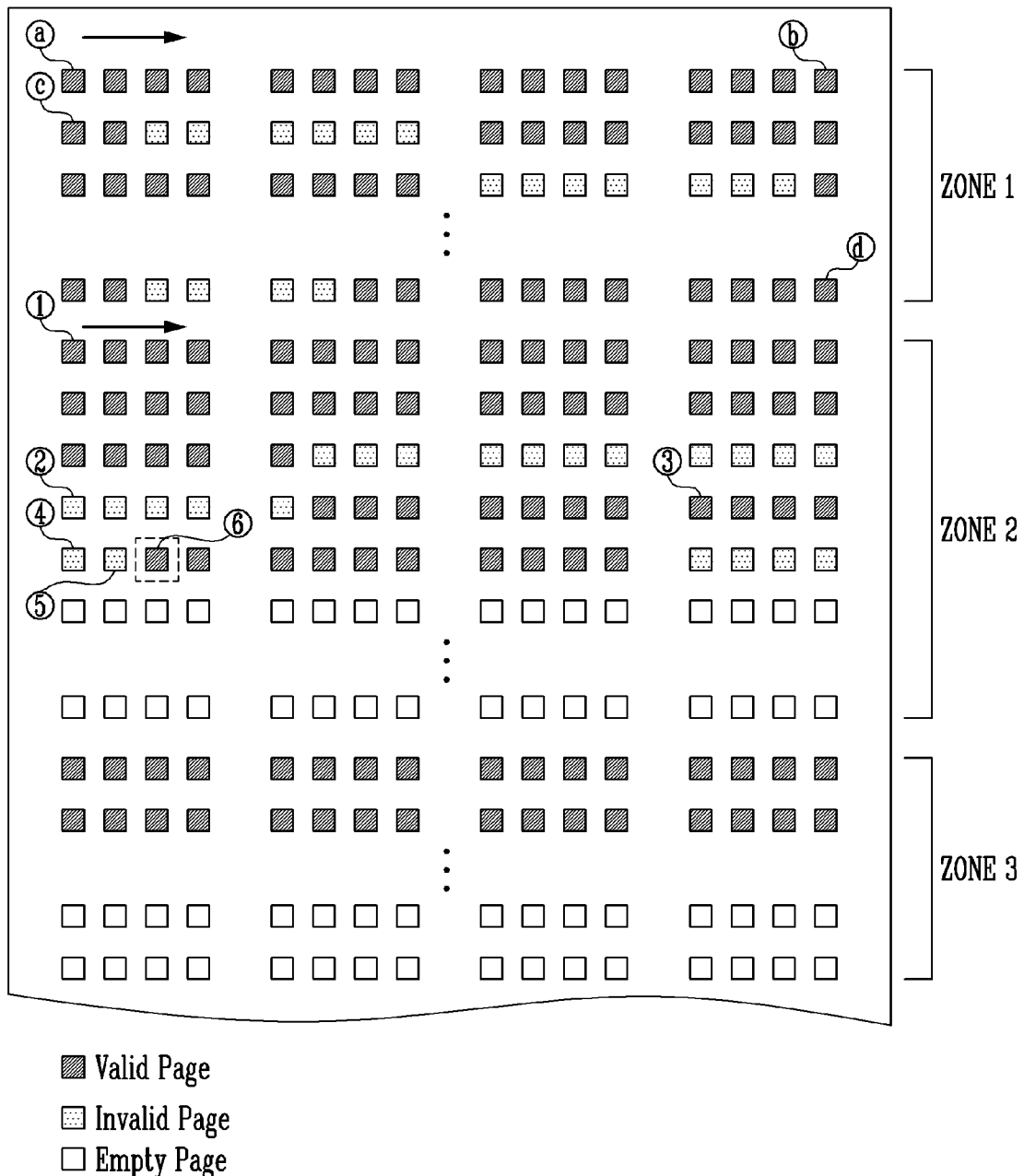
FIG. 13 is a diagram illustrating a procedure for calculating a valid read address using a valid page table.

FIG. 12 is a flowchart illustrating an example of the step of calculating a valid read address illustrated in FIG. 11. FIG. 13 is a diagram illustrating a procedure for calculating a valid read address using a valid page table. Below, the operation of calculating a valid read address is described with reference to FIGS. 12 and 13 together.

First, referring to FIG. 13, an embodiment of a valid page table indicating whether pieces of page data included in a plurality of zones (e.g., ZONE 1, ZONE 2, ZONE 3, . . . ) are valid is illustrated. In FIG. 13, hatched areas indicate valid pages, dotted areas indicate invalid pages, that is, pages in which dummy data is stored, and white areas indicate empty pages in which data is not stored.

In ZONE 1, a start address is page #0, which is a position indicated by "ⓐ" in the valid page table illustrated in FIG. 13. The address may increase in a direction from position "ⓐ" to the right. In an example illustrated in FIG. 13, the position of a last page in a first row is page #15, which is a position indicated by "ⓑ" in the valid page table of FIG. 13. A page subsequent to "ⓑ" is page #16, which is a position indicated by "ⓒ" in the valid page table of FIG. 13. In this way, the last address of ZONE 1 is the position indicated by "ⓓ" in the valid page table. Referring to FIG. 13, one row of the valid page table has 16 columns.

In the example of FIG. 13, a situation in which a read operation is requested to be performed on an address of "48" in ZONE 2 is considered. The address of ZONE 2 starts at a position indicated by "①." The addresses of a first row of ZONE 2 correspond to pages #0 to #15, and the addresses of a second row thereof correspond to pages #16 to #31. Further, the addresses of a third row of ZONE 2 correspond to pages #32 to #47.

A first address of a fourth row of ZONE 2 corresponds to page #48. Assuming that all pages ranging from page #0 to page #48 indicate valid page data, a read operation should be performed on page #48. However, since a total of 12 invalid pages are present among the pages ranging from page #0 to page #48, at least 12 page offsets should be applied to read addresses. As 12 page offsets are applied to page #48 corresponding to position "②," page #60 corresponding to position "③" is selected.

Since four invalid pages are present between page #48 corresponding to position "②" and page #60 corresponding to position "③," four page offsets should be applied again to the updated read addresses. As four page offsets are applied to page #60 corresponding to position "③," page #64 corresponding to position "④" is selected. Since one invalid page is present between page #60 corresponding to position "③" and page #64 corresponding to position "④," page #65 corresponding to position "⑤" is selected.

Although no invalid page is present between page #64 and page #65, the page #65 is an invalid page, and thus an address is moved until a valid page appears. Referring to FIG. 13, page #66 corresponding to position "⑥" is a valid page, and thus page #66 is determined to be a valid read address indicating the position on which a read operation is to be actually performed.

The relationships between page #66 indicating the valid read address, page #48 indicating the read address received from the host, and the number of invalid pages present therebetween are described as follows. A total of 18 invalid pages are present between page #0 corresponding to the start address "①" of ZONE 2 and page #66 corresponding to the valid read address "⑥." Addresses corresponding to the invalid pages may be pages ranging from page #37 to page #52 and pages ranging from page #64 to page #65. That is, an offset for calculating a valid read address from the read address received from the host may be 18. In accordance with the memory controller based on the embodiment of the disclosed technology, the offset is calculated depending on the number of invalid pages between the start address of a selected zone and the read address received from the host, and an additional offset is calculated while the address is moved from the read address by the calculated offset. The above-described process is repeated until invalid pages are not detected any further, and thus a valid read address is finally determined.

Referring back to FIG. 12, an embodiment of the above-described step S350 of calculating the valid address is illustrated. At step S410, a temporary address is initialized. The temporary address may be initialized to a read address corresponding to the read request. That is, the temporary address initialized at step S410 indicates position ② corresponding to the read address.

At step S420, the number of invalid pages between the start address of the zone corresponding to the read request and the read address is counted. In the example illustrated in FIG. 13, the number of invalid pages present between "①" and "②" is 12 (page #37 to page #48).

At step S430, the temporary address is updated based on the counted number of invalid pages. At step S430, the counted number of invalid pages is 12, and thus the temporary address is increased by 12. That is, the temporary address updated at step S430 indicates position "③" as illustrated in FIG. 13.

At step S440, the number of invalid pages $N_{INV}$ between a previous temporary address and the updated temporary address is counted. The previous temporary address indicates position "②" as illustrated in FIG. 13, and the updated current temporary address indicates position "③" as illustrated in FIG. 13. In the example of FIG. 13, the number of invalid pages present between positions "②" and "③" is 4 (page #49 to page #52).

At step S450, whether the counted number of invalid pages $N_{INV}$ is 0 is determined. Since the counted number of invalid pages $N_{INV}$ is 4 (in the case of No at step S450), the process may return to step S430, and thus the temporary address is updated based on the counted number of invalid pages. That is, the temporary address is increased by 4. Accordingly, the updated temporary address indicates position "④" as illustrated in FIG. 13.

At step S440, the number of invalid pages $N_{INV}$ between the previous temporary address and the updated temporary address is counted. The previous temporary address indicates position "③," and the updated current temporary address indicates position "④." In the example illustrated in FIG. 13, the number of invalid pages present between positions "③" and "④" is 1 (page #64).

At step S450, whether the counted number of invalid pages $N_{INV}$ is 0 is determined. Since the counted number of invalid pages $N_{INV}$ is 1 (in the case of No at step S450), the process may return to step S430, and thus the temporary address is updated based on the counted number of invalid pages. That is, the temporary address is increased by 1. Accordingly, the updated temporary address indicates position "⑤" of FIG. 13.

At step S440, the number of invalid pages $N_{INV}$ between the previous temporary address and the updated temporary address is counted. The previous temporary address indicates position "④," and the updated current temporary address indicates position "⑤." In the example of FIG. 13, the number of invalid pages present between positions "④" and "⑤" is 1 (page #65).

At step S450, whether the counted number of invalid pages $N_{INV}$ is 0 is determined. Since the counted number of invalid pages $N_{INV}$ is 1 (in the case of No at step S450), the process may return to step S430, and thus the temporary address is updated based on the counted number of invalid pages. That is, the temporary address is increased by 1. Accordingly, the updated temporary address indicates position "⑥."

At step S440, the number of invalid pages $N_{INV}$ between the previous temporary address and the updated temporary address is counted. The previous temporary address indicates position "⑤," and the updated current temporary address indicates position "⑥." In the example illustrated in FIG. 13, the number of invalid pages present between positions "⑤" and "⑥" is zero (0).

At step S450, whether the counted number of invalid pages $N_{INV}$ is 0 is determined. Since the counted number of invalid pages $N_{INV}$ is 0, the updated temporary address is determined to be the valid read address at step S460. That is, since the updated current temporary address indicates position "⑥," the valid read address also indicates position "⑥." That is, page #66 corresponding to position "⑥" is determined to be the valid read address.

Figure 14:
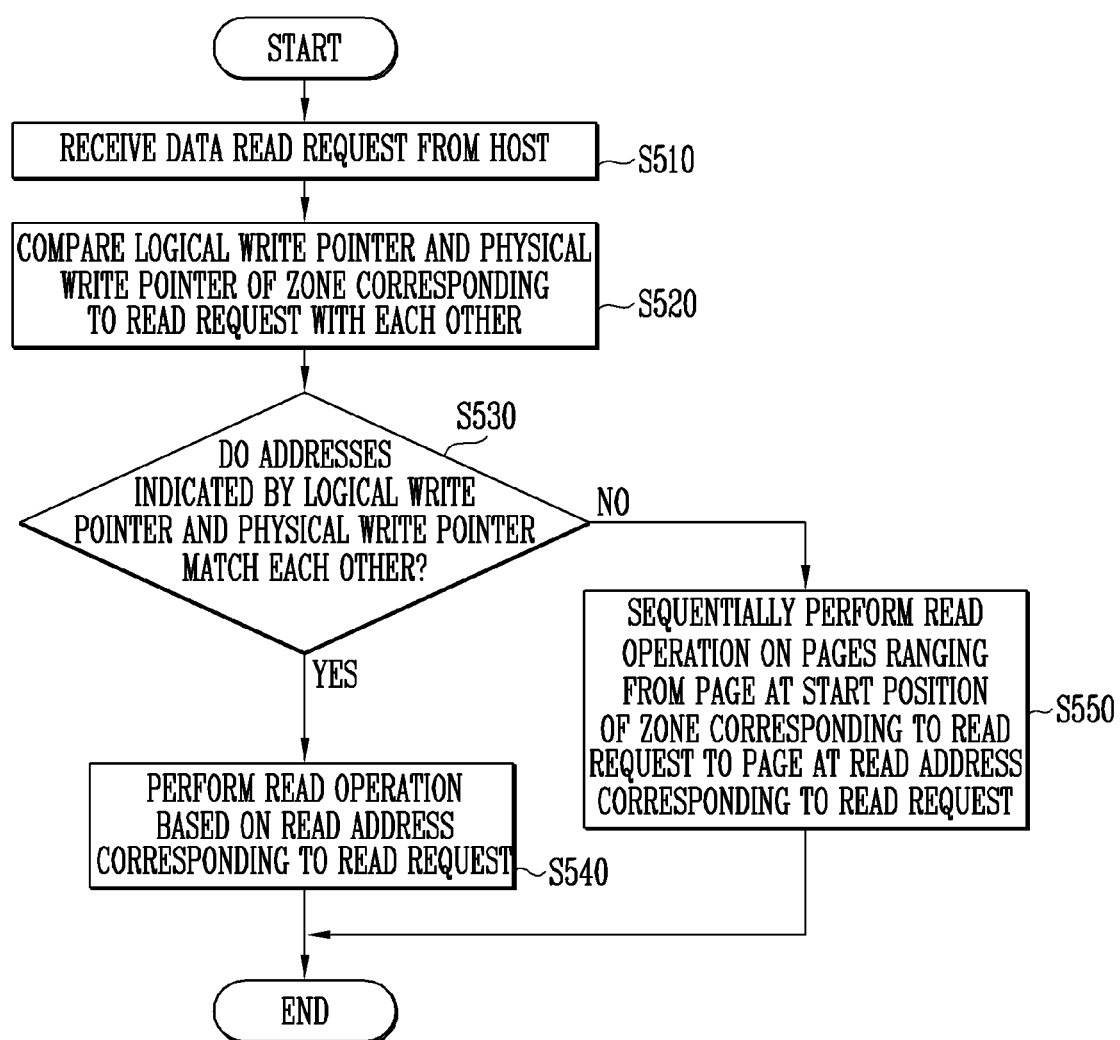
FIG. 14 is a flowchart illustrating the operation of a memory controller based on an embodiment of the disclosed technology.

FIG. 14 is a flowchart illustrating the operation of a memory controller based on an embodiment of the disclosed technology. More specifically, FIG. 14 is a flowchart illustrating the operation of the memory controller when a read request is received from the host.

Referring to FIG. 14, the memory controller 200 may receive a data read request from the host at step S510. The FTL 213 of the memory controller 200 compares a logical write pointer LWP and a physical write pointer PWP of a zone corresponding to the read request with each other at step S520. Whether addresses indicated by the logical write pointer LWP and the physical write pointer PWP match each other is determined at step S530.

When the addresses indicated by the logical write pointer LWP and the physical write pointer PWP match each other (in the case of Yes at step S530), it means that dummy data is not stored in the corresponding zone. Therefore, a read operation is performed based on a read address corresponding to the read request at step S540. Since dummy data is not stored in the zone that is a read target, a read operation may be performed by directly using the read address received from the host 50.

When the addresses indicated by the logical write pointer LWP and the physical write pointer PWP do not match each other (in the case of No at step S530), it means that dummy data is stored in the corresponding zone. Therefore, the read address corresponding to the read request cannot be used without change, and the read operation should be performed by applying an offset corresponding to the dummy data to the read address. The read operation is sequentially performed on pages ranging from a page at the start position of the zone corresponding to the read request to a page at the read address corresponding to the read request at step S550. In FIGS. 11 to 13, a valid read address is calculated using a valid page table and a read operation is performed based on the calculated valid read address. In contrast, in FIG. 14, data corresponding to a read request is read through an iterative read operation without requiring a valid page table. An example of step S550 will be described below with reference to FIG. 15.

Figure 15:
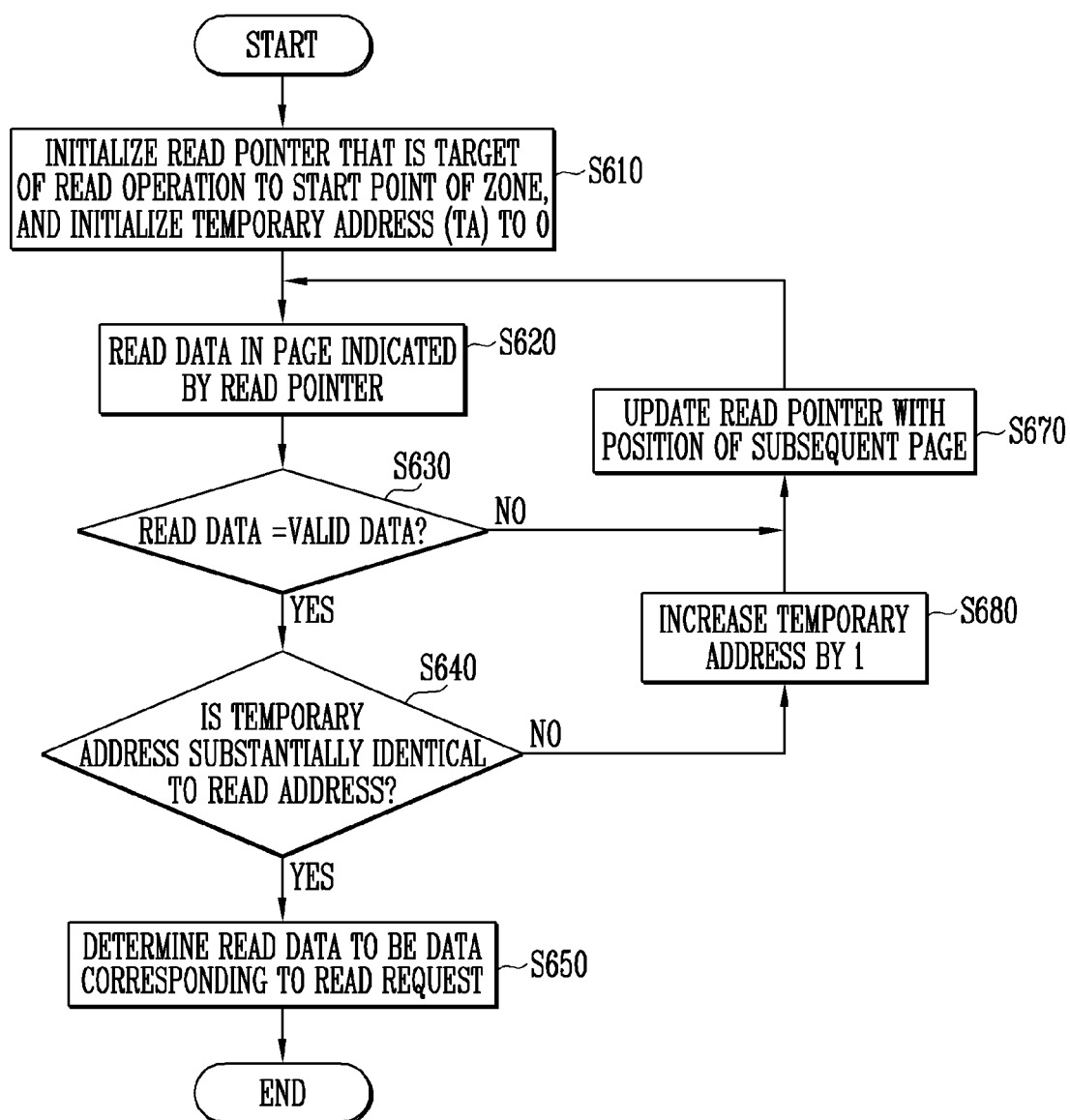
FIG. 15 is a flowchart illustrating the operation for reading data corresponding to a read request through an iterative read operation without requiring a valid page table, illustrated in FIG. 14.
Figure 16A:
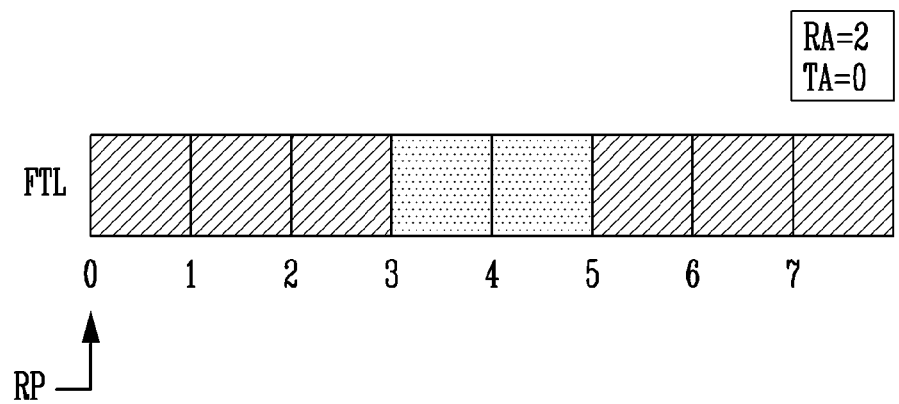
FIGS. 16A to 16C are diagrams for explaining the method illustrated in FIG. 15.
Figure 16B:
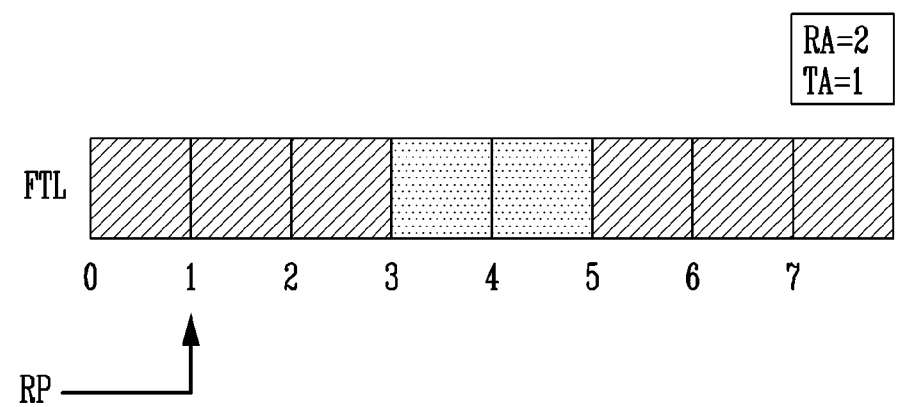
Figure 16C:
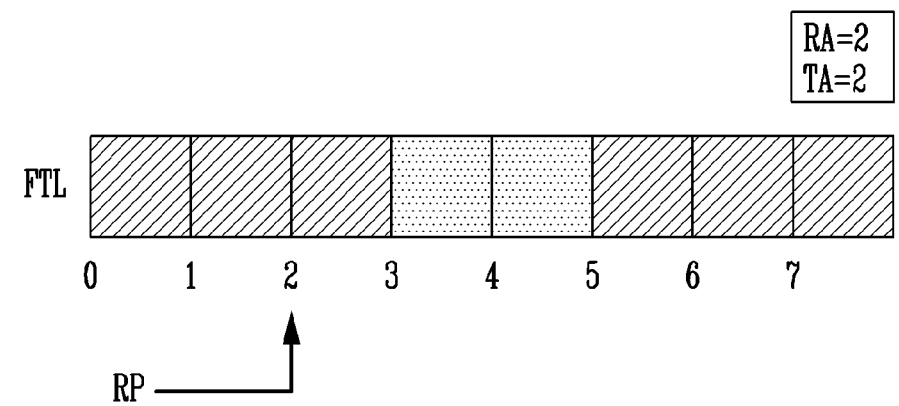

FIG. 15 is a flowchart the operation for reading data corresponding to a read request through an iterative read operation without requiring a valid page table, illustrated in FIG. 14. FIGS. 16A to 16C are diagrams for explaining the method illustrated in FIG. 15. FIGS. 17A to 17G are diagrams for explaining the method illustrated in FIG. 15.

Hereinafter, a description will be made with reference to FIGS. 15 and 16A to 16C. In the example cases illustrated in FIGS. 16A to 16C, a read address RA may indicate an offset of valid pages of 2 in a zone.

At step S610, a read pointer RP that is the target of a read operation is initialized to the start point of the zone. Also, at step S610, a temporary address TA is initialized to 0. As illustrated in FIG. 16A, the read pointer RP is initialized to a position indicating page #0 in the zone.

At step S620, data in a page currently indicated by the read pointer is read. Since the read pointer RP indicates page #0, data in page #0 in the memory device is actually read.

At step S630, whether the read data is valid data is determined. When page #0 is actually read at step S620, whether data in page #0 is valid data or dummy data may be determined through spare data or the like included in page #0. Referring to FIG. 16A, data in page #0 is valid data, and thus the process proceeds to step S640.

At step S640, whether the temporary address is substantially identical to the read address is determined. Since the current temporary address TA is 0 and the read address RA is 2 (in the case of No at step S640), the process proceeds to step S680.

At step S680, the value of the temporary address TA is increased by 1. At step S670, the read pointer RP is updated with the position of a subsequent page. Therefore, at step S670, the read pointer RP may indicate page #1. Thereafter, the process returns to step S620.

Referring to FIG. 16B, the read pointer RP indicates page #1 and the temporary address TA is updated with 1. Data in page #1 is read at step S620, and whether the data in page #1 is valid data is determined at step S630. Since the data in page #1 is valid data (in the case of Yes at step S630), as illustrated in FIG. 16B, whether the temporary address is substantially identical to the read address is determined at step S640. Since the current temporary address TA is 1 and the read address RA is 2 (in the case of No at step S640), the process proceeds to step S680. At step S680, the temporary address TA is updated with 2. At step S670, the read pointer RP may indicate page #2. Thereafter, the process returns to step S620.

Referring to FIG. 16C, the read pointer RP indicates page #2 and the temporary address TA is updated with 2. Data in page #2 is read at step S620, and whether the data in page #2 is valid data is determined at step S630. Since the data in page #2 is valid data (in the case of Yes at step S630), as illustrated in FIG. 16C, whether the temporary address is substantially identical to the read address is determined at step S640. Since the current temporary address TA is 2 and the read address RA is 2 (in the case of Yes at step S640), the process proceeds to step S650. At step S650, the data in page #2, which is currently read, is determined to be data corresponding to the read request.

Referring to FIGS. 16A to 16C, the case where all page data between the start position of the zone and the position corresponding to the actual read address is valid page data is illustrated. In this case, whenever valid pages are sequentially read, the value of the temporary address TA is also repeatedly updated. By means of this, valid page data at the position corresponding to the actual read address may be read.

Hereinafter, a description will be made with reference to FIGS. 15 and 17A to 17G. In exemplary cases illustrated in FIGS. 17A to 17G, a read address RA may indicate an offset of valid pages of 4 in a zone.

Figure 17A:
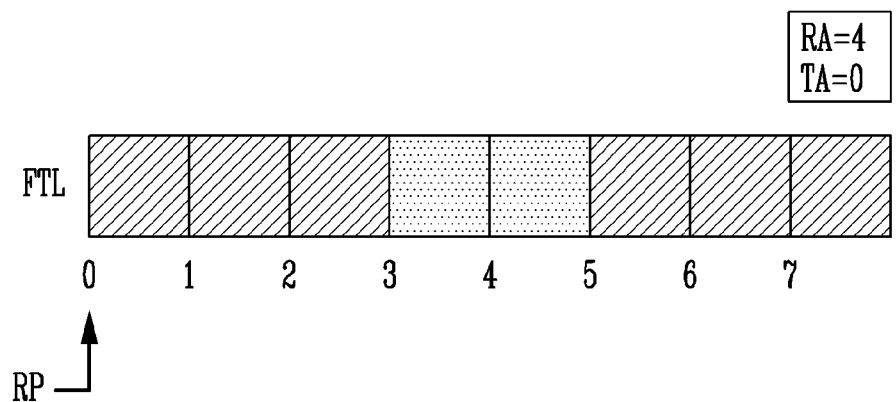
FIGS. 17A to 17G are diagrams for explaining the method illustrated in FIG. 15.

At step S610, a read pointer RP that is the target of a read operation is initialized to the start point of the zone. Also, at step S610, a temporary address TA is initialized to 0. As illustrated in FIG. 17A, the read pointer RP is initialized to a position indicating page #0 in the zone.

At step S620, data in a page currently indicated by the read pointer is read. Since the read pointer RP indicates page #0, data in page #0 in the memory device is actually read.

At step S630, whether the read data is valid data is determined. When page #0 is actually read at step S620, whether data in page #0 is valid data or dummy data may be determined through spare data or the like included in page #0. Referring to FIG. 17A, data in page #0 is valid data, and thus the process proceeds to step S640.

At step S640, whether the temporary address is substantially identical to the read address is determined. Since the current temporary address TA is 0 and the read address RA is 4 (in the case of No at step S640), the process proceeds to step S680.

At step S680, the value of the temporary address TA is increased by 1. At step S670, the read pointer RP is updated with the position of a subsequent page. Therefore, at step S670, the read pointer RP may indicate page #1. Thereafter, the process returns to step S620.

Figure 17B:
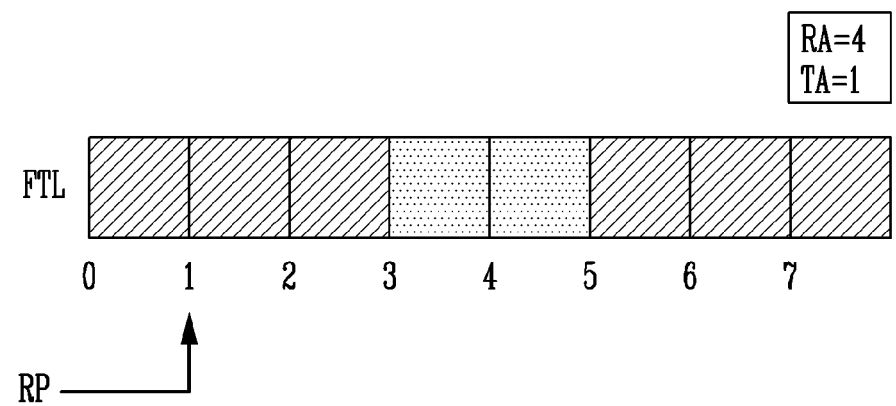

Referring to FIG. 17B, the read pointer RP indicates page #1 and the temporary address TA is updated with 1. Data in page #1 is read at step S620, and whether the data in page #1 is valid data is determined at step S630. Since the data in page #1 is valid data (in the case of Yes at step S630), as illustrated in FIG. 17B, whether the temporary address is substantially identical to the read address is determined at step S640. Since the current temporary address TA is 1 and the read address RA is 4 (in the case of No at step S640), the process proceeds to step S680. At step S680, the temporary address TA is updated with 2. At step S670, the read pointer RP may indicate page #2. Thereafter, the process returns to step S620.

Figure 17C:
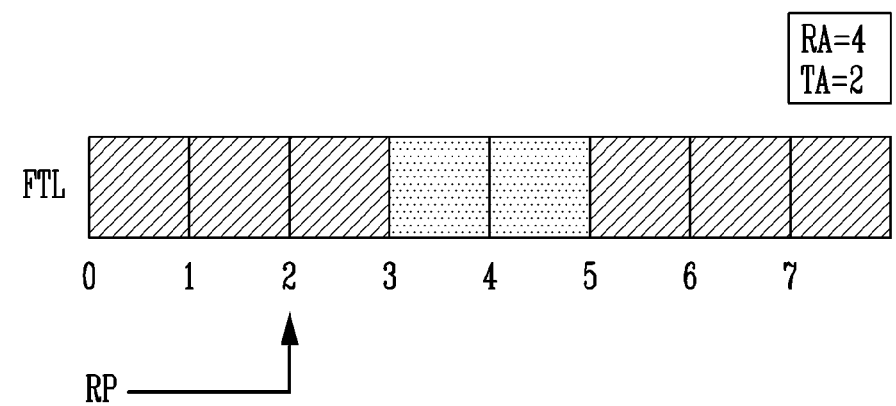

Referring to FIG. 17C, the read pointer RP indicates page #2 and the temporary address TA is updated with 2. Data in page #2 is read at step S620, and whether the data in page #2 is valid data is determined at step S630. Since the data in page #2 is valid data (in the case of Yes at step S630), as illustrated in FIG. 17C, whether the temporary address is substantially identical to the read address is determined at step S640. Since the current temporary address TA is 2 and the read address RA is 4 (in the case of No at step S640), the process proceeds to step S680. At step S680, the temporary address TA is updated with 3. At step S670, the read pointer RP may indicate page #3. Thereafter, the process returns to step S620.

Figure 17D:
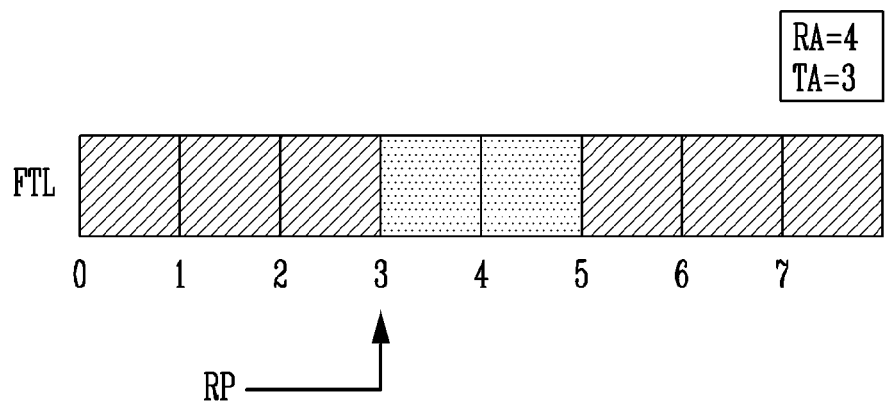

Referring to FIG. 17D, the read pointer RP indicates page #3 and the temporary address TA is updated with 3. Data in page #3 is read at step S620, and whether the data in page #3 is valid data is determined at step S630. As illustrated in FIG. 17D, the data in page #3 is dummy data that is invalid data (in the case of No at step S630), and thus the process proceeds to step S670. At step S670, the read pointer RP may indicate page #4. Thereafter, the process returns to step S620. As illustrated in FIG. 15, when the read data is not valid data, the value of the temporary address TA is not increased.

Figure 17E:
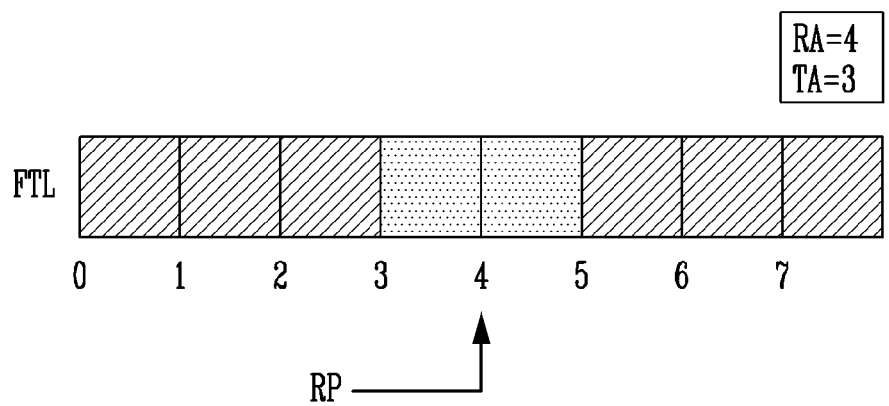

Referring to FIG. 17E, the read pointer RP indicates page #4 and the temporary address TA is maintained at 3. Data in page #4 is read at step S620, and whether the data in page #4 is valid data is determined at step S630. As illustrated in FIG. 17E, the data in page #4 is dummy data that is invalid data (in the case of No at step S630), and thus the process proceeds to step S670. At step S670, the read pointer RP may indicate page #5. Thereafter, the process returns to step S620.

Figure 17F:
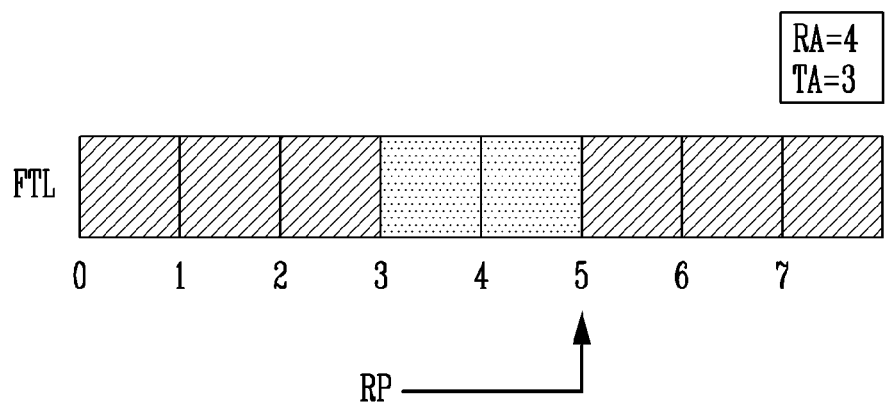

Referring to FIG. 17F, the read pointer RP indicates page #5 and the temporary address TA is maintained at 3. Data in page #5 is read at step S620, and whether the data in page #5 is valid data is determined at step S630. Since the data in page #5 is valid data (in the case of Yes at step S630), as illustrated in FIG. 17F, whether the temporary address is substantially identical to the read address is determined at step S640. Since the current temporary address TA is 3 and the read address RA is 4 (in the case of No at step S640), the process proceeds to step S680. At step S680, the temporary address TA is updated with 4. At step S670, the read pointer RP may indicate page #6. Thereafter, the process returns to step S620.

Figure 17G:
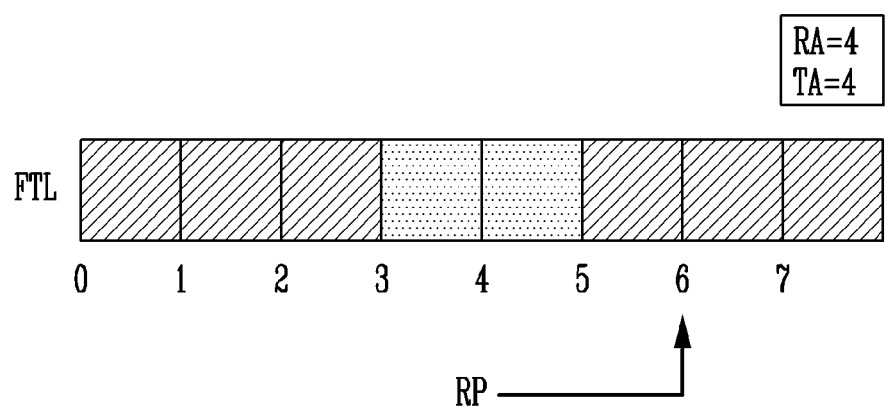

Referring to FIG. 17G, the read pointer RP indicates page #6 and the temporary address TA is updated with 4. Data in page #6 is read at step S620, and whether the data in page #6 is valid data is determined at step S630. Since the data in page #6 is valid data (in the case of Yes at step S630), as illustrated in FIG. 17G, whether the temporary address is substantially identical to the read address is determined at step S640. Since the current temporary address TA is 4 and the read address RA is 4 (in the case of Yes at step S640), the process proceeds to step S650. At step S650, the data in page #6, which is currently read, is determined to be data corresponding to the read request.

Referring to FIGS. 17A to 17G, the case where all page data between the start position of the zone and the position corresponding to the actual read address is not valid page data is illustrated. In this case, when a valid page is read during the reading of data, the temporary address TA is updated, whereas when a dummy page is read, the temporary address TA is not updated. By means of this, valid page data at the position corresponding to the actual read address may be read.

Figure 18A:
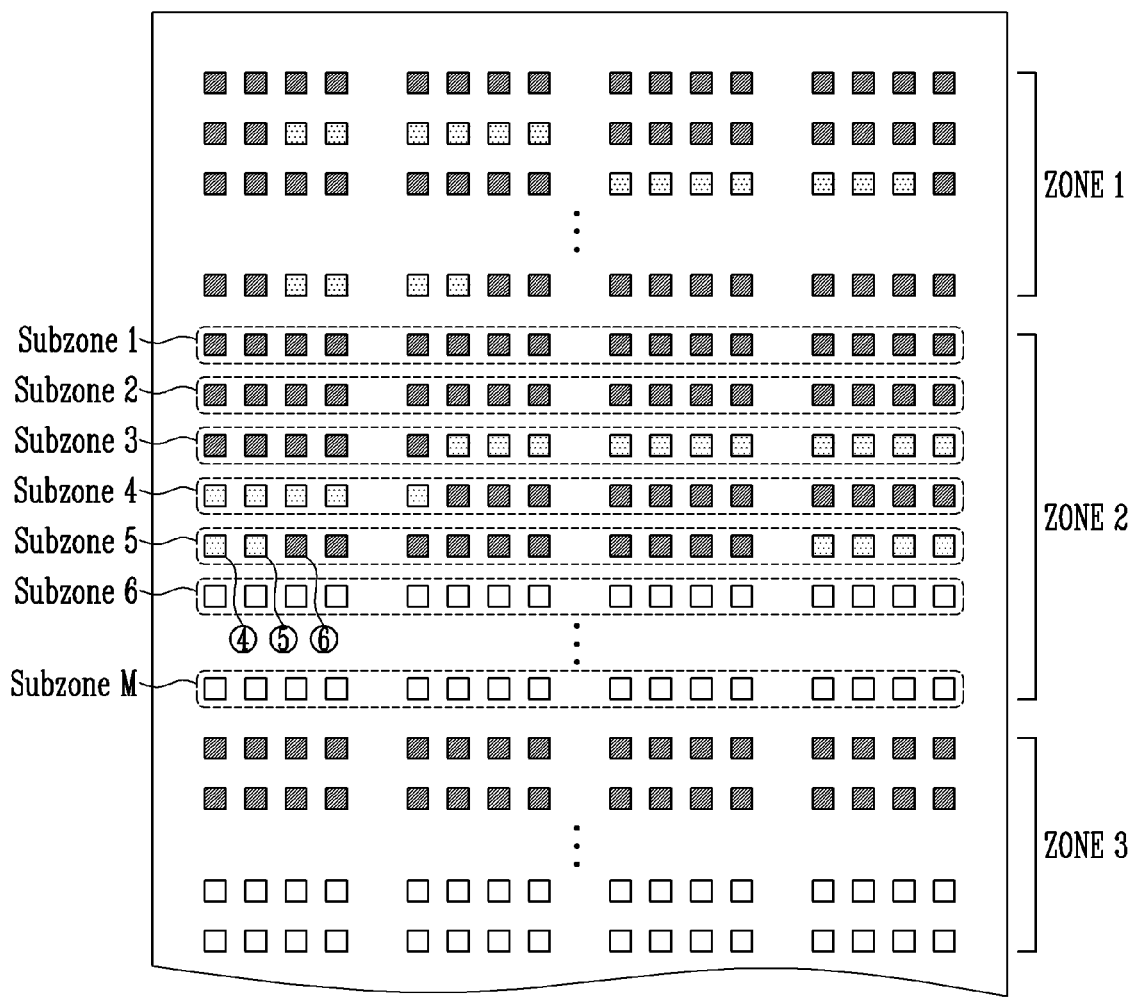

FIGS. 18A and 18B are diagrams for explaining a procedure for calculating a valid read address using a valid page table and an invalid page lookup table. Referring to FIG. 18A, the same valid page as in the example described with reference to FIG. 13 is illustrated.

In an embodiment of the disclosed technology, each zone includes a plurality of subzones. In FIG. 18A, each of the subzones is illustrated as including 16 pages. However, the disclosed technology is not limited thereto, and a variety of numbers of pages may be included in respective subzones.

FIG. 18B illustrates an invalid page lookup table based on an embodiment of the disclosed technology. Referring to FIG. 18B, an invalid page lookup table corresponding to ZONE 2 is illustrated. Although not illustrated in FIG. 18B, invalid page lookup tables corresponding to the remaining zones other than ZONE 2 may also be present.

A first column of the invalid page lookup table indicates numbers for identifying subzones included in ZONE 2, that is, subzone ID. As illustrated in FIG. 18A, ZONE 2 includes M subzones. Therefore, the subzone ID included in the invalid page lookup table also ranges from 1 to M.

A second column of the invalid page lookup table indicates the number of invalid pages included in each subzone. Referring to FIGS. 18A and 18B together, all of 16 pages included in subzone 1 are valid pages. Therefore, the number of invalid pages corresponding to a subzone ID of 1 is 0. Here, 16 pages included in subzone 2 are valid pages. Therefore, the number of invalid pages corresponding to a subzone ID of 2 is also 0.

Further, subzone 3 includes five valid pages and 11 invalid pages. Therefore, the number of invalid pages corresponding to a subzone ID of 3 is 11. In this way, the numbers of invalid pages respectively corresponding to subzone 1 to subzone M may be included in the invalid page lookup table. The invalid page lookup table may be stored, together with the valid page table, in a memory component 230.

In an embodiment of the disclosed technology, a valid read address may be rapidly calculated by using the invalid page lookup table and the valid page table together. In the same way as that illustrated with reference to FIG. 13, a situation in which a read operation is requested to be performed on an address of "48" in ZONE 2 is considered.

Since each subzone includes 16 pages, a subzone in which a page corresponding to the requested address "48" is included may be promptly determined in consideration of invalid pages included in the subzones.

Since subzone 1 includes 0 invalid pages, valid pages corresponding to addresses from "0" to "15" in ZONE 2 may be included in subzone 1.

Since subzone 2 includes 0 invalid pages, valid pages corresponding to addresses from "16" to "31" in ZONE 2 may be included in subzone 2.

Since subzone 3 includes 11 invalid pages, valid pages corresponding to addresses from "32" to "36" in ZONE 2 may be included in subzone 3.

Since subzone 4 includes 5 invalid pages, valid pages corresponding to addresses from "37" to "47" in ZONE 2 may be included in subzone 4.

Since subzone 5 includes 6 invalid pages, valid pages corresponding to addresses from "48" to "57" in ZONE 2 may be included in subzone 5.

Therefore, the address "48" of ZONE 2 is included in subzone 5. More specifically, a first valid page, among valid pages included in subzone 5, is a page corresponding to the address "48".

Accordingly, with reference to the valid page table, the position of address "48" may be searched for in subzone 5. Since page #64 corresponding to position "④" as illustrated in 18A is an invalid page, a subsequent page is referred to. Since page #65 corresponding to position "⑤" as illustrated in 18A is an invalid page, a subsequent page is referred to. Since page #66 corresponding to position "⑥" as illustrated in 18A is a valid page, page #66 is determined to be a valid read address indicating a position on which a read operation is to be actually performed.

In accordance with the description made above with reference to FIG. 13, when a valid read address is calculated using only a valid page table, the valid page table should be referred to from a first page in ZONE 2, which is a read target. However, when the invalid page lookup table illustrated in FIG. 18B, together with the valid page table, is referred to, a subzone including a page corresponding to a valid read address, among a plurality of subzones, is first determined, and the valid read address may be determined with reference to the valid page table from a first page of the determined subzone. Accordingly, the speed of calculation of the valid read address may be improved, with the result that the read speed of the memory system may be improved.

Although the method of determining a valid read address by referring to the valid page table and the invalid page lookup table together has been described with reference to FIGS. 18A and 18B, the disclosed technology is not limited thereto. For example, the valid read address may be determined using only the invalid page lookup table without using the valid page table. Referring to FIGS. 14 to 17G, the method of reading data corresponding to a read request using an iterative read operation without using a valid page table has been described. In this case, as described above with reference to FIGS. 17A to 17G, a data read operation should be performed from the first position of the corresponding zone.

In contrast, when the invalid page lookup table is used, a subzone including a valid page corresponding to a valid read address, among a plurality of subzones, may be determined. By utilizing this determination, the operation illustrated in FIG. 15 may be performed from the first position of the subzone including the valid page. In this case, at step S610, a read pointer that is the target of a read operation is initialized to a start point of the subzone, and a temporary address TA is initialized to a logical address corresponding to the last valid page of a previous subzone.

Referring to FIG. 18B, when a read request for an address of "48" is received, valid pages corresponding to addresses of "37" to "47" of ZONE 2 are included in subzone 4, as described above. That is, steps illustrated in FIG. 15 are performed in accordance with subzone 5. For this operation, at step S610, a read pointer that is the target of a read operation is initialized to a start point of subzone 5, and a temporary address TA is initialized to "47" that is a logical address corresponding to the last valid page of subzone 4. By performing subsequent steps S620, S630, S640, S680, and S670, page #66 corresponding to position "⑥" as illustrated in 18A may be determined to be a valid read address indicating a position on which an actual read operation is to be performed. In some implementations of the disclosed technology, read operations on 64 pages included in subzone 1 to subzone 4 may be skipped, and thus the read speed of the memory system may be greatly improved.

Figure 19:
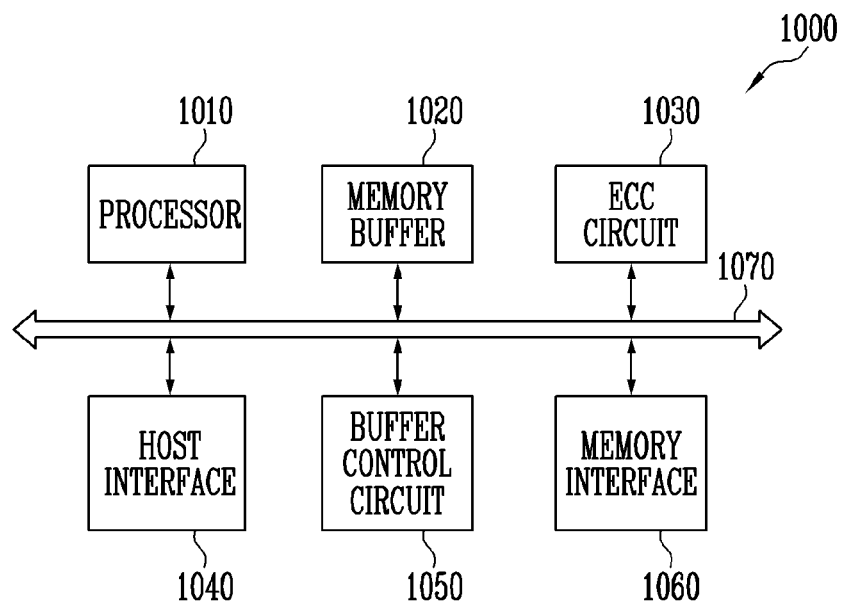
FIG. 19 is a diagram illustrating an example of a memory controller based on some embodiments of the disclosed technology.

FIG. 19 is a diagram illustrating an example of a memory controller based on some embodiments of the disclosed technology.

Referring to FIG. 19, a memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may provide a channel between components of the memory controller 1000.

The processor 1010 may control the overall operation of the memory controller 1000 and perform a logical operation. The processor 1010 may communicate with an external host through the host interface 1040 and also communicate with a memory device through the memory interface 1060. Further, the processor 1010 may communicate with the memory buffer 1020 through the buffer control circuit 1050. The processor 1010 may control the operation of a storage device by using the memory buffer 1020 as a working memory, a cache memory or a buffer memory.

The processor 1010 may perform a function of a flash translation layer (FTL). The processor 1010 may randomize data received from the host. For example, the processor 1010 may use a random seed to randomize data received from the host. The randomized data may be provided, as data to be stored, to the memory device, and may be programmed to a memory cell array.

The processor 1010 may derandomize the data received from the memory device during a read operation. For example, the processor 1010 may use the derandomized seed to derandomize the data received from the memory device. Derandomized data may be output to the host.

In an embodiment, the processor 1010 may run software or firmware to perform the randomizing or derandomizing operation.

The memory buffer 1020 may be used as a working memory, a cache memory, or a buffer memory of the processor 1010. The memory buffer 1020 may store codes and commands that are executed by the processor 1010. The memory buffer 1020 may store data that is processed by the processor 1010. The memory buffer 1020 may include a static RAM (SRAM) or a dynamic RAM (DRAM).

The ECC circuit 1030 may perform error correction. The ECC circuit 1030 may perform error correction code (ECC) encoding based on data to be written to the memory device through the memory interface 1060. The ECC-encoded data may be transferred to the memory device through the memory interface 1060. The ECC circuit 1030 may perform ECC decoding on data received from the memory device through the memory interface 1060. In an example, the ECC circuit 1030 may be included, as the component of the memory interface 1060, in the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Non-Volatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may transmit data in the memory controller 1000, and the control bus may transmit control information, such as commands or addresses, in the memory controller 1000. The data bus and the control bus may be separated from each other, and may neither interfere with each other nor influence each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 20:
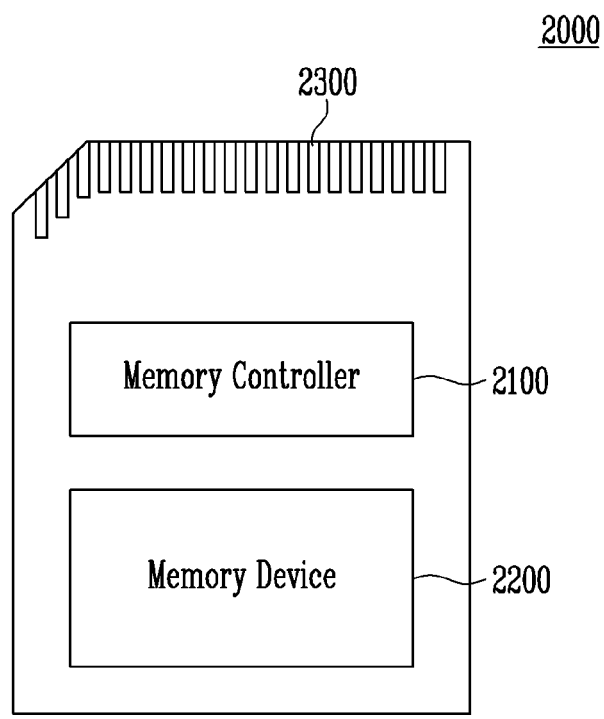
FIG. 20 is a block diagram illustrating a memory card system that includes a storage device including a memory device based on an embodiment of the disclosed technology.

FIG. 20 is a block diagram illustrating a memory card system that includes a storage device including a memory device based on an embodiment of the disclosed technology.

Referring to FIG. 20, a memory card system 2000 may include a memory controller 2100, a memory device 2200, and a connector 2300.

The memory controller 2100 is coupled to the memory device 2200. The memory controller 2100 may access the memory device 2200. The memory controller 2100 may be implemented in the same manner as the memory controller 1000, described above with reference to FIG. 19.

In an embodiment, the memory controller 2100 may include components, such as a RAM, a processor, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), an advanced technology attachment (ATA) protocol, a serial-ATA (SATA), parallel-ATA (PATA), small computer system interface (SCSI), enhanced small disk interface (ESDI), integrated drive electronics (IDE), firewire, universal flash storage (UFS), WIFI, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (Re-RAM), a Ferroelectric RAM (FRAM), and a Spin Transfer Torque Magnetic RAM (STT-MRAM).

In an embodiment, the memory controller 2100 or the memory device 2200 may be packaged in a type such as Package on Package (PoP), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flat pack (TQFP), Small Outline (SOIC), Shrink Small Outline Package (SSOP), Thin Small Outline Package (TSOP), System In Package (SIP), Multi-Chip Package (MCP), Wafer-level Fabricated Package (WFP), Wafer-Level Processed Stack Package (WSP), or the like, and may be provided as a single semiconductor package. Alternatively, the memory device 2200 may include a plurality of nonvolatile memory chips, which may be packaged based on the above-described package types and may then be provided as a single semiconductor package.

In an embodiment, the memory controller 2100 and the memory device 2200 may be integrated into a single semiconductor device. In an embodiment, the memory controller 2100 and the memory device 2200 may be integrated into a single semiconductor device to form a solid state drive (SSD). The memory controller 2100 and the memory device 2200 may be integrated into a single semiconductor device to form a memory card. For example, the memory controller 2100 and the memory device 2200 may be integrated into a single semiconductor device to form a memory card such as a personal computer memory card international association (PCMCIA), a compact flash card (CF), a smart media card (SM or SMC), a memory stick multimedia card (MMC, RS-MMC, MMCmicro or eMMC), a SD card (SD, miniSD, microSD, or SDHC), or a universal flash storage (UFS).

Figure 21:
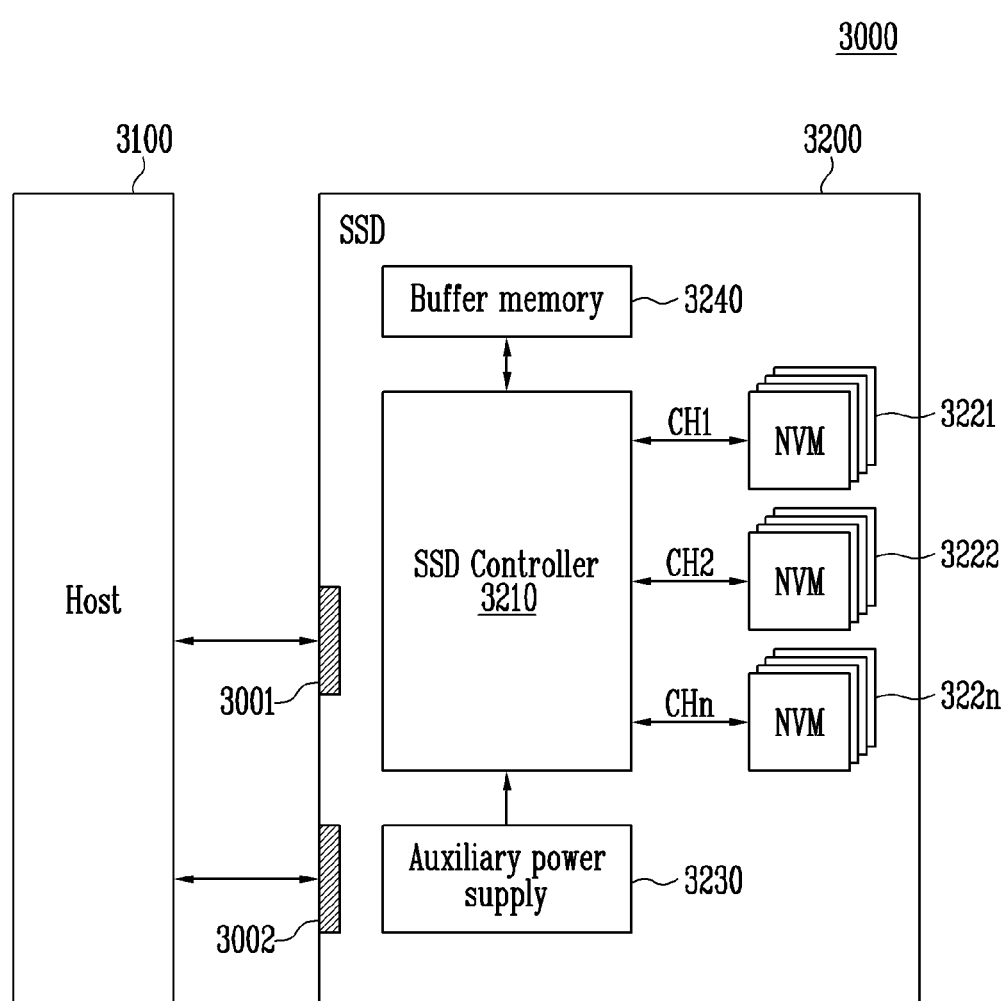
FIG. 21 is a block diagram illustrating an example of a solid state drive (SSD) system that includes a storage device including a memory device based on an embodiment of the disclosed technology.

FIG. 21 is a block diagram illustrating an example of a solid state drive (SSD) system that includes a storage device including a memory device based on an embodiment of the disclosed technology.

Referring to FIG. 21, an SSD system 3000 may include a host 3100 and an SSD 3200. The SSD 3200 may exchange a signal SIG with the host 3100 through a signal connector 3001, and may receive power PWR through a power connector 3002. The SSD 3200 may include an SSD controller 3210, a plurality of flash memories 3221 to 322*n*, an auxiliary power supply 3230, and a buffer memory 3240.

In an embodiment, the SSD controller 3210 may perform a function of the memory controller 1000, described above with reference to FIG. 19.

The SSD controller 3210 may control the plurality of flash memories 3221 to 322*n* in response to the signal SIG received from the host 3100. In an embodiment, the signal SIG may indicate signals based on the interfaces of the host 3100 and the SSD 3200. For example, the signal SIG may be a signal defined by at least one of various interfaces such as universal serial bus (USB), multimedia card (MMC), embedded MMC (eMMC), peripheral component interconnection (PCI), PCI-express (PCI-E), an advanced technology attachment (ATA), serial-ATA (SATA), parallel-ATA (PATA), small computer system interface (SCSI), enhanced small disk interface (ESDI), integrated drive electronics (IDE), firewire, universal flash storage (UFS), WiFi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be located inside the SSD 3200 or located outside the SSD 3200. For example, the auxiliary power supply 3230 may be located in a main board, and may also provide auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322$n$, or may temporarily store metadata (e.g., mapping tables) of the flash memories 3221 to 322$n$. The buffer memory 3240 may include volatile memories, such as DRAM, SDRAM, DDR SDRAM, LPDDR SDRAM, and GRAM, or nonvolatile memories, such as FRAM, ReRAM, STT-MRAM, and PRAM.

Figure 22:
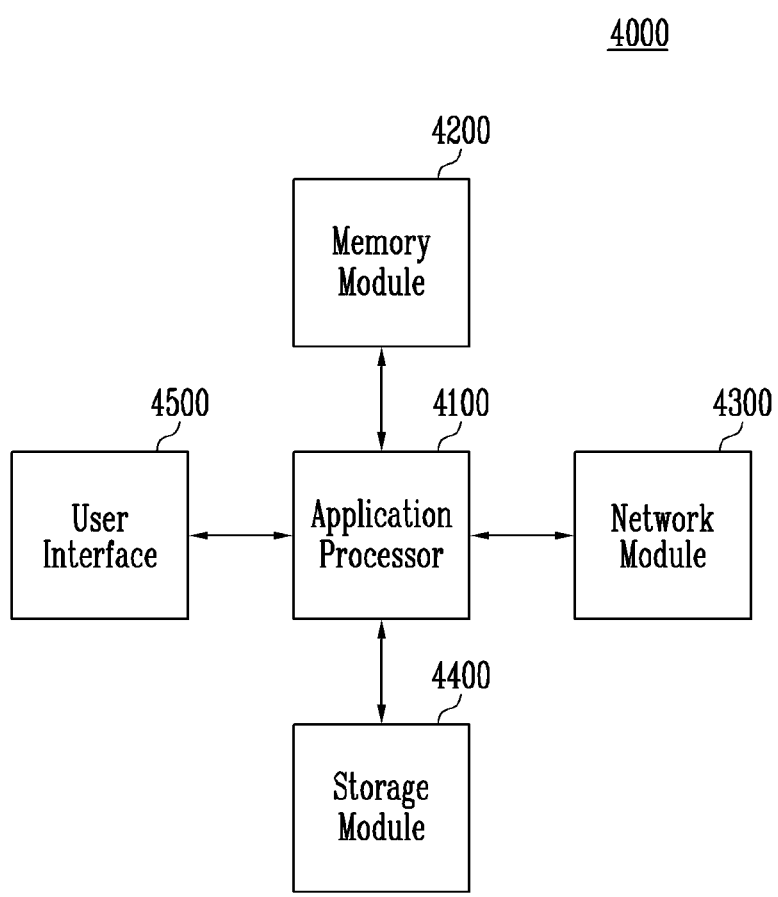
FIG. 22 is a block diagram illustrating a user system that can use a storage device including a memory device based on an embodiment of the disclosed technology.

FIG. 22 is a block diagram illustrating a user system that can use a storage device including a memory device based on an embodiment of the disclosed technology.

Referring to FIG. 22, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be formed of a system-on-chip (SoC).

The memory module 4200 may act as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDARM, LPDDR2 SDRAM, and LPDDR3 SDRAM or nonvolatile RAMs such as PRAM, ReRAM, MRAM, and FRAM. In an embodiment, the application processor 4100 and the memory module 4200 may be packaged based on a package-on-package (POP), and may then be provided as a single semiconductor package.

The network module 4300 may communicate with external devices. In an embodiment, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), Wimax, WLAN, UWB, Bluetooth, or WI-FI. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (removable drive), such as a memory card or an external drive of the user system 4000.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may further include user output interfaces such as an a Liquid Crystal Display (LCD), an Organic Light Emitting Diode (OLED) display device, an Active Matrix OLED (AMOLED) display device, an LED, a speaker, and a monitor.

A memory system based on embodiments of the disclosed technology may improve the operational stability of a zoned namespace.

What is claimed is:

1. A memory system including a storage area divided into a plurality of zones, comprising:
    a memory device having memory blocks constituting the plurality of zones;
    a memory controller configured to control write operations of the memory device,
    wherein the memory controller is configured to:
    receive a write request and a write pointer associated with a zone from a host; and
    update a physical pointer when the memory device performs the first write operation in response to the write request received from the host, or when the memory device performs a second write operation in response to an internal write command issued by the memory controller,
    wherein the physical pointer indicates a physical location where a write operation has been most recently performed in the memory device.

2. The memory system based on claim 1, wherein the second write operation corresponding to the internal write command is a dummy data write operation performed by a flash translation layer of the memory controller.

3. The memory system based on claim 1, wherein the memory controller is configured to, upon receiving the write request from the host, compare a logical the write pointer and the physical pointer of a zone corresponding to the received write request with each other and process the write request based on a result of the comparison.

4. The memory system based on claim 3, wherein, when addresses indicated by the write pointer and the physical pointer match each other, the memory controller is configured to determine whether the write pointer has reached a size of the zone and process the write request based on a result of the determination.

5. The memory system based on claim 4, wherein, when the write pointer has reached the size of the zone, the memory controller is configured to provide, to the host, a message indicating that the zone that is targeted to perform the first write operation corresponding to the write request received from the host is full.

6. The memory system based on claim 4, wherein, when the write pointer has not reached the size of the zone, the memory controller is configured to perform the first write operation corresponding to the write request.

7. The memory system based on claim 3, wherein, when addresses indicated by the write pointer and the physical pointer do not match each other, the memory controller is configured to determine whether the physical pointer has reached a size of the zone and process the write request based on a result of the determination.

8. The memory system based on claim 7, wherein, when the physical pointer has reached the size of the zone, the memory controller is configured to provide, to the host, a message indicating that the zone that is targeted to perform the first write operation corresponding to the write request received from the host is full.

9. The memory system based on claim 7, wherein, when the physical pointer has not reached the size of the zone, the memory controller is configured to perform the first write operation corresponding to the write request.

10. The memory system based on claim 1, wherein the memory controller is configured to, upon receiving a data read request and a corresponding read address from the host, compare the write pointer and the physical pointer of a zone corresponding to the received data read request with each other and process the data read request based on a result of the comparison.

11. The memory system based on claim 10, wherein, when addresses indicated by the write pointer and the physical pointer match each other, the memory controller is configured to perform a read operation based on the read address.

12. The memory system based on claim 10, wherein, when addresses indicated by the write pointer and the physical pointer do not match each other, the memory controller is configured to calculate a valid read address from the read address based on a valid page table, and perform a read operation based on the calculated valid read address, and
wherein the valid page table includes information indicating whether data in each page stored in the zone that is targeted to perform the read operation corresponding to the data read request received from the host is user data received from the host or dummy data that fills empty spaces in the zone.

13. The memory system based on claim 12, wherein the memory controller is configured to calculate the valid read address from the read address depending on an offset based on the dummy data included in the valid page table.

14. The memory system based on claim 13, wherein the memory controller is configured to:
initialize a temporary address to the read address;
count a first number of invalid pages between a start address of the zone that is targeted to perform the read operation corresponding to the data read request received from the host and the read address;
update the temporary address based on the first number of invalid pages;
count a second number of invalid pages between the temporary address before being updated and an updated temporary address; and
determine whether the second number of invalid pages is zero.

15. The memory system based on claim 14, wherein, when the second number of invalid pages is zero, the memory controller is configured to determine the updated temporary address to be the valid read address, and
wherein, when the second number of invalid pages is not zero, the memory controller is configured to re-update the temporary address based on the second number of invalid pages.

16. A memory controller configured to control write operations of a memory device having a storage area divided into a plurality of zones, wherein the memory controller is configured to:
receive a write request and a write pointer associated with a zone from a host; and
update a physical pointer when the memory device performs the first write operation in response to the write request received from the host, and when the memory device performs a second write operation in response to an internal write command internally issued by the memory controller,
wherein the physical pointer indicates a physical location where a write operation has been most recently performed in the memory device.

17. The memory controller based on claim 16, comprising:
a host interface layer configured to receive the write request or a read request from the host;
a flash translation layer configured to control write operations corresponding to the internal write command;
a write buffer configured to store write data received from the host; and
a valid page table including information indicating whether data in each page stored in at least one of the plurality of zones is user data received from the host or dummy data that fills empty spaces in the zone.

18. A storage system comprising:
a host issuing a write request for storing data;
a memory controller receiving the write request and a write pointer associated with a zone from a host; and
a memory device having a storage area divided into a plurality of zones,
wherein the memory controller is configured to:
upon performing a first write operation corresponding to the write request received from the host, update a physical pointer associated with a zone that is targeted to perform the first write operation,
upon performing a second write operation corresponding to an internal write command internally issued by the memory controller, update the physical pointer associated with the zone that is targeted to perform the second write operation, and
wherein the physical pointer indicates a physical location where a write operation has been most recently performed in the memory device.

19. The storage system based on claim 18, wherein the second write operation corresponding to the internal write command is a dummy data write operation performed by a flash translation layer of the memory controller.

20. The memory system based on claim 1, wherein the memory controller is configured to, upon receiving a write request from the host, compare the write pointer and the physical pointer of a zone corresponding to the received write request with each other and process the write request based on a result of the comparison.

* * * * *